US009847916B2

(12) United States Patent
Chiba et al.

(10) Patent No.: US 9,847,916 B2
(45) Date of Patent: Dec. 19, 2017

(54) CONTROL APPARATUS, CONTROL APPARATUS CONTROL METHOD, AND PROGRAM

(71) Applicant: NEC Corporation, Tokyo (JP)

(72) Inventors: Yasunobu Chiba, Tokyo (JP); Kazushi Sugyou, Tokyo (JP)

(73) Assignee: NEC Corporation, Tokyo (JP)

( * ) Notice: Subject to any disclaimer, the term of this patent is extended or adjusted under 35 U.S.C. 154(b) by 201 days.

(21) Appl. No.: 14/758,184

(22) PCT Filed: Dec. 27, 2013

(86) PCT No.: PCT/JP2013/085053
§ 371 (c)(1),
(2) Date: Jun. 26, 2015

(87) PCT Pub. No.: WO2014/104278
PCT Pub. Date: Jul. 3, 2014

(65) Prior Publication Data
US 2015/0333970 A1    Nov. 19, 2015

(30) Foreign Application Priority Data

Dec. 28, 2012 (JP) ................................. 2012-288377

(51) Int. Cl.
*H04L 12/28* (2006.01)
*H04L 12/24* (2006.01)
(Continued)

(52) U.S. Cl.
CPC .......... *H04L 41/20* (2013.01); *H04L 12/6418* (2013.01); *H04L 45/028* (2013.01);
(Continued)

(58) Field of Classification Search
CPC combination set(s) only.
See application file for complete search history.

(56) References Cited

U.S. PATENT DOCUMENTS 8,693,344 B1 * 4/2014 Adams .................... H04L 49/65
370/241
8,787,388 B1 * 7/2014 Adams .................... H04L 45/38
370/244
(Continued)

FOREIGN PATENT DOCUMENTS

JP    S 63-164547 A    7/1988
JP    2006-211661 A    8/2006
(Continued)

OTHER PUBLICATIONS

Open Flow Networking Foundation, OpenFlow Switch Specification, Version 1.3.1 (Wire Protocol 0x04), 128 pages, Sep. 2012.*
(Continued)

*Primary Examiner* — Frank Duong
(74) *Attorney, Agent, or Firm* — Finnegan, Henderson, Farabow, Garrett & Dunner, L.L.P.

(57) ABSTRACT

A control apparatus includes a packet handling operation setting unit that sets a packet handling operation for processing a packet for a communication node selected from a plurality of communication nodes. The packet handling operation setting unit sets the packet handling operation for communication nodes out of the plurality of communication nodes other than the selected communication node, in response to the fact that it was possible to set the packet handling operation for the selected communication node.

32 Claims, 15 Drawing Sheets

(51) Int. Cl.
- *H04L 12/759* (2013.01)
- *H04L 12/725* (2013.01)
- *H04L 12/64* (2006.01)
- *H04L 12/715* (2013.01)
- *H04L 12/717* (2013.01)

(52) U.S. Cl.
CPC .............. *H04L 45/30* (2013.01); *H04L 45/42* (2013.01); *H04L 45/64* (2013.01)

(56) References Cited

U.S. PATENT DOCUMENTS

| | | | |
|---|---|---|---|
| 9,124,517 B2* | 9/2015 | Philavong | ............... H04L 45/38 |
| 2006/0168279 A1 | 7/2006 | Lee et al. | |
| 2011/0261723 A1* | 10/2011 | Yamato | ................... H04L 45/34 |
| | | | 370/255 |
| 2012/0093158 A1 | 4/2012 | Chiba | |
| 2013/0201821 A1 | 8/2013 | Yamato et al. | |

FOREIGN PATENT DOCUMENTS

| | | |
|---|---|---|
| WO | WO 2011/149003 A1 | 12/2011 |
| WO | WO 2012/049807 A1 | 4/2012 |

OTHER PUBLICATIONS

International Search Report (ISR) (PCT Form PCT/ISA/210), in PCT/JP2013/085053, dated Feb. 10, 2014.

Nick McKeown, et. al. "OpenFlow: Enabling Innovation in Campus Networks," [online], [searched on Nov. 27, 2012], the Internet <URL: http://www.openflow.org/documents/openflow-wp-latest.pdf>.

"OpenFlow Switch Specification" Version 1.1.0 Implemented (Wire Protocol 0x02), [online], [searched on Nov. 27, 2012], the Internet <URL:http://www.openflow.org/documents/openflow-spec-v1.1.0.pdf>.

* cited by examiner

FIG. 8

| COMMUNICATION NODE TYPE | PRIORITY |
|---|---|
| EXIT NODE | HIGH |
| INGRESS NODE | MEDIUM |
| VIA NODE | LOW |

CONTROL APPARATUS, CONTROL APPARATUS CONTROL METHOD, AND PROGRAM

TECHNICAL FIELD

Reference to Related Application

The present invention is based upon and claims the benefit of the priority of Japanese patent application No. 2012-288377 filed on Dec. 28, 2012, the disclosure of which is incorporated herein in its entirety by reference thereto.

The present invention relates to a control apparatus, control apparatus control method, and program, and particularly to a control apparatus, control apparatus control method, and program that centrally control a network.

BACKGROUND

In recent years, a technology called OpenFlow has been proposed (refer to Non-Patent Literatures 1 and 2). OpenFlow treats communication as an end-to-end flow and performs path control, failure recovery, load balancing, and optimization for each flow. An OpenFlow switch, specified in Non-Patent Literature 2, comprises a secure channel for communicating with an OpenFlow controller and operates according to a flow table, an addition to or rewriting of which is suitably instructed by the OpenFlow controller. In the flow table, a set of matching rule (Match Fields) to be matched against a packet header, flow statistics (Counters), and Instructions defining the processing contents is defined for each flow (refer to the section of "4.1 Flow Table" in Non-Patent Literature 2).

For instance, upon receiving a packet, the OpenFlow switch searches for an entry having a matching rule (refer to "4.3 Match Fields" in Non-Patent Literature 2) that matches the header information of the received packet in the flow table. When an entry matching the received packet is found as a result of the search, the OpenFlow switch updates the flow statistics (Counters) and performs the processing contents (packet transmission from a designated port, flooding, discard, etc.) written in the instruction field of the entry on the received packet. On the other hand, when no entry matching the received packet is found as a result of the search, the OpenFlow switch requests the OpenFlow controller to set an entry via the secure channel, transmitting a request (Packet-In message) for control information for processing the received packet. The OpenFlow switch receives a flow entry that defines the processing contents and updates the flow table. As described, the OpenFlow switch forwards packets using entries stored in the flow table as control information.

[Non-Patent Literature 1]
Nick McKeown, et. al. "OpenFlow: Enabling Innovation in Campus Networks," [online], [searched on Nov. 27, 2012], the Internet <URL: http://www.openflow.org/documents/openflow-wp-latest.pdf>

[Non-Patent Literature 2]
"OpenFlow Switch Specification" Version 1.1.0 Implemented (Wire Protocol 0x02), [online], [searched on Nov. 27, 2012], the Internet <URL:http://www.openflow.org/documents/openflow-spec-v1.1.0.pdf>

SUMMARY

The disclosure of each cited literature above is incorporated herein in its entirety by reference thereto. The following analysis is given by the present inventors.

As described above, in a network centrally controlled by a control apparatus, packets are forwarded by having the control apparatus (for instance an OpenFlow controller) set a packet handling operation for a communication node (for instance an OpenFlow switch). At this time, if the control apparatus sets a processing rule (i.e., packet handling rule, termed herein as "packet handling operation") for each of a plurality of communication nodes in parallel (en bloc), the setting of a packet handling operation for a communication node may be wasted in some cases.

For instance, in FIG. 15, a control apparatus 200 needs to set a packet handling operation for communication nodes 203 to 205 in order to forward a packet from a communication terminal 201 to a communication terminal 202. In a case where the packet handling operation is set for the communication nodes 203 to 205 in parallel, if, for instance, the setting of the packet handling operation for the communication node 205 fails, the setting of the packet handling operation for the communication nodes 203 and 204 may be wasted. Since the control apparatus requires its own resources as well as available network resources in order to set a packet handling operation for the communication nodes, it is preferred that a situation in which the setting of a packet handling operation for a communication node is wasted be avoided.

Therefore, it is an object of the present invention to provide a control apparatus, control apparatus control method, and program that contribute to the reduction of the possibility that the setting of a packet handling operation for a communication node is wasted in a centrally controlled network.

According to a first aspect of the present invention, there is provided a control apparatus comprising a packet handling operation setting unit that sets a packet handling operation for processing a packet for a communication node selected from a plurality of communication nodes, and the packet handling operation setting unit sets the packet handling operation for communication nodes other than the selected communication node out of the plurality of communication nodes in response to the fact that it was possible to set the packet handling operation for the selected communication node.

According to a second aspect of the present invention, there is provided a control apparatus control method comprising selecting a communication node, for which a packet handling operation for processing a packet is set, from a plurality of communication nodes, and setting the packet handling operation for the selected communication node; and the packet handling operation is set for communication nodes other than the selected communication node out of the plurality of communication nodes in setting the packet handling operation in response to the fact that it was possible to set the packet handling operation for the selected communication node.

Further, the present method is tied to a particular machine, which is a control apparatus that centrally controls a network.

According to a third aspect of the present invention, there is provided a program having a computer that controls a control apparatus execute a process of selecting a communication node, for which a packet handling operation for processing a packet is set, from a plurality of communication nodes, and a process of setting the packet handling operation for the selected communication node; and the packet handling operation is set for communication nodes other than the selected communication node out of the plurality of communication nodes in the process of setting the packet handling operation in response to the fact that it was possible to set the packet handling operation for the selected communication node.

Further, this program can be stored in a computer-readable storage medium. The storage medium may be a non-transient one such as semiconductor memory, hard disk, magnetic storage medium, and optical storage medium. The present invention can be realized as a computer program product.

According to each aspect of the present invention, there is provided a control apparatus, control apparatus control method, and program that contribute to the reduction of the possibility that the setting of a packet handling operation for a communication node is wasted in a centrally controlled network.

BRIEF DESCRIPTION OF THE DRAWINGS

FIG. 8 is a drawing showing an example of a priority order used by a control apparatus 20a relating to a second exemplary embodiment.

PREFERRED MODES

First, a summary of an exemplary embodiment will be given using FIG. 1. Note that drawing reference signs in the summary are given to each element as an example solely to facilitate understanding for convenience and the summary is not intended to imply any limitation.

As described above, if a control apparatus sets a packet handling operation in parallel for a plurality of communication nodes controlled by the control apparatus, packet handling operations already set may be wasted. Therefore, desired is a control apparatus that reduces the possibility of wasting the setting of a packet handling operation for a communication node in a centrally controlled network.

Figure 1:
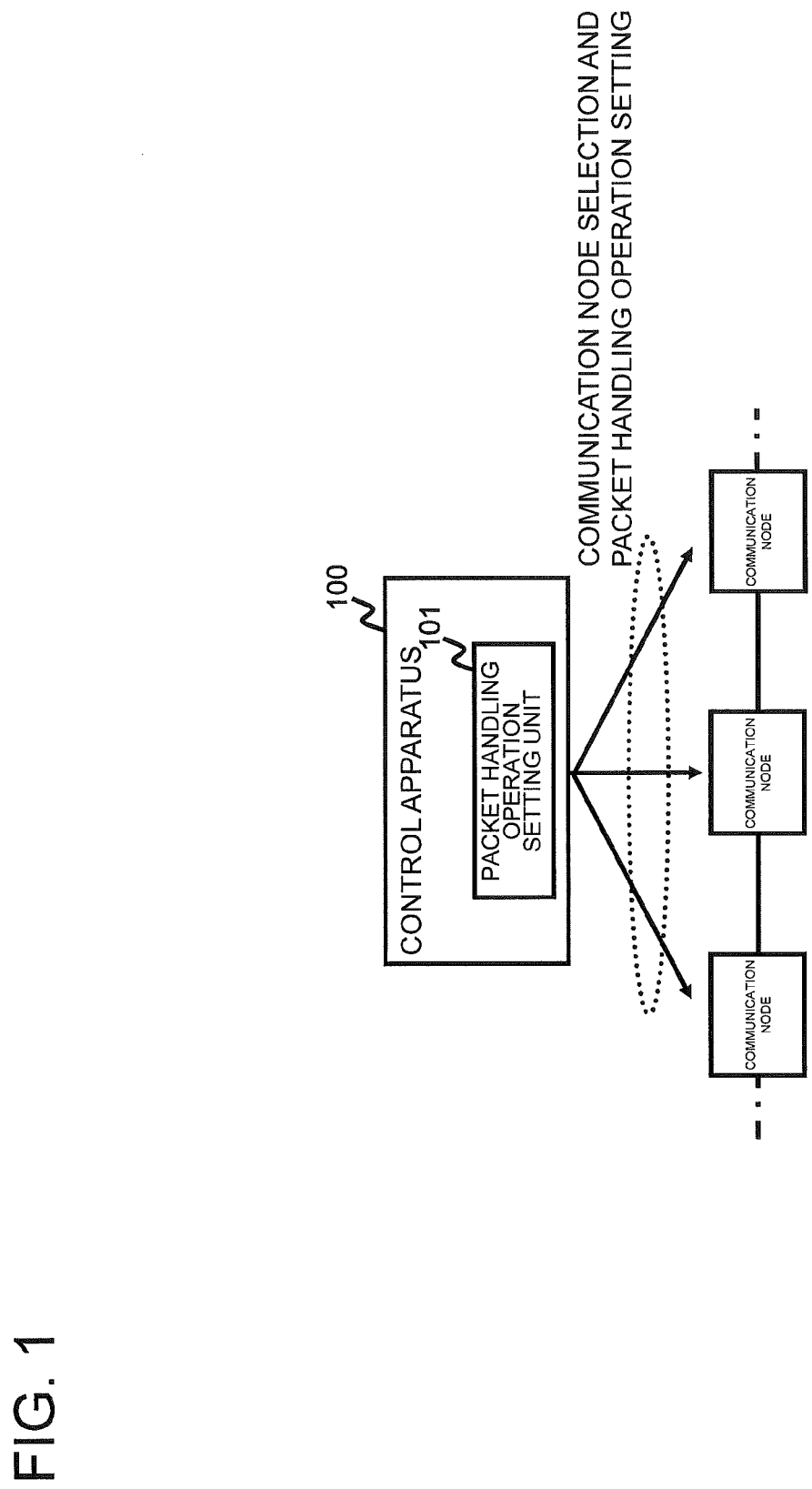
FIG. 1 is a drawing for explaining a summary of an exemplary embodiment.

As an example, a control apparatus 100 shown in FIG. 1 is provided. The control apparatus 100 comprises a packet handling operation setting unit 101 that sets a packet handling operation for processing a packet for a communication node selected from a plurality of communication nodes. The packet handling operation setting unit 101 sets a packet handling operation for a communication node other than the selected communication node out of the plurality of communication nodes in response to the fact that it was possible to set the packet handling operation for the selected communication node.

The control apparatus 100 does not set a packet handling operation for the plurality of communication nodes in parallel. The control apparatus 100 selects at least one communication node from the plurality of communication nodes, and sets a packet handling operation for the selected communication node. Further, the control apparatus 100 selects a communication node for which the setting of the packet handling operation has not been completed and sets the packet handling operation, in response to the confirmation that it has been able to set the packet handling operation successfully for the selected communication node. As a result, when the setting of the packet handling operation for a communication node is unsuccessful, subsequent processing can be suspended, and the possibility of wasting the setting of a packet handling operation for a communication node can be reduced.

Below, concrete exemplary embodiments will be described more in detail with reference to the drawings.

[Exemplary Embodiment 1]

A first exemplary embodiment will be described more in detail using the drawings.

Figure 2:
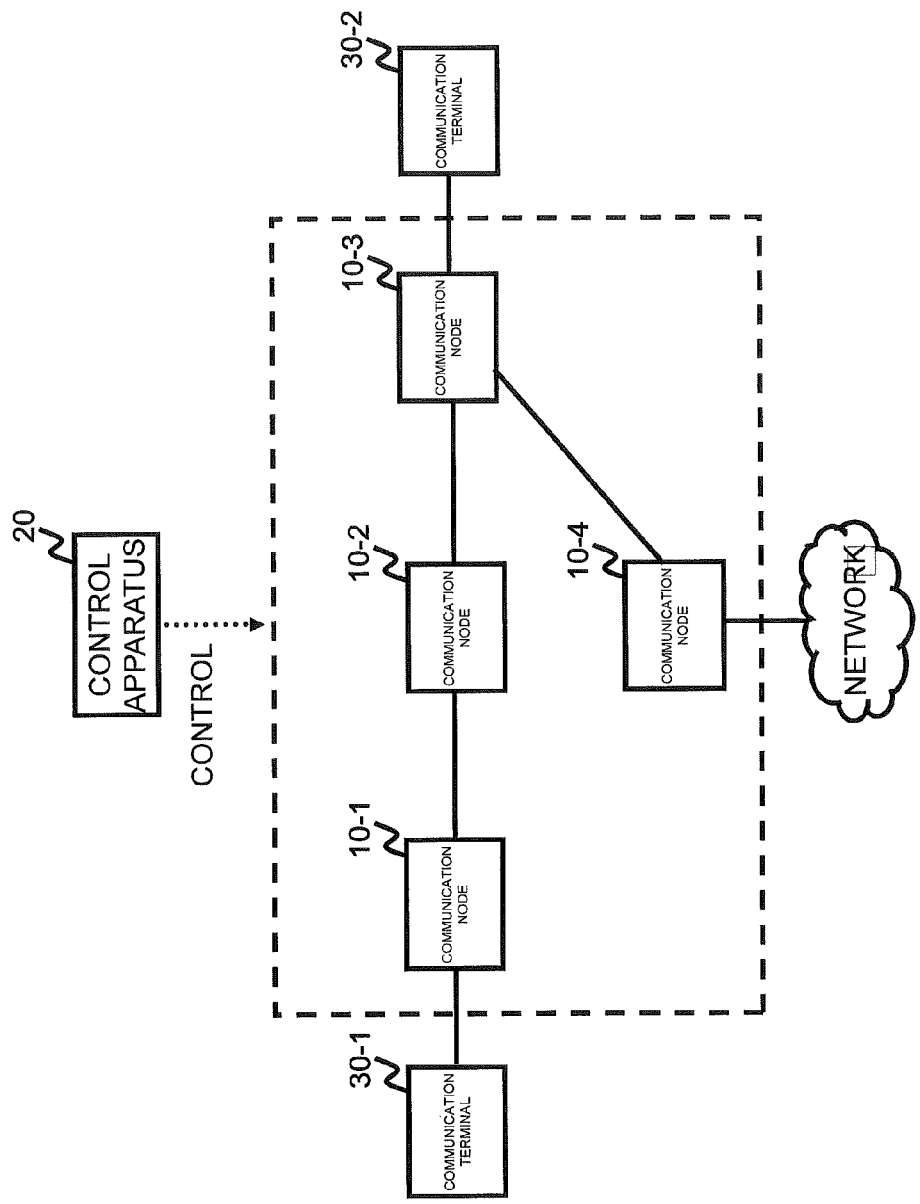
FIG. 2 is a drawing showing an example of a communication system relating to a first exemplary embodiment.

FIG. 2 is a drawing showing an example of a communication system relating to the first exemplary embodiment. FIG. 2 shows a configuration including communication nodes 10-1 to 10-4 that realize communication between networks, a control apparatus 20 that controls a network constituted by the communication nodes 10-1 to 10-4, and communication terminals 30-1 and 30-2. For instance, the control apparatus 20 corresponds to the OpenFlow controller, and the communication nodes 10-1 to 10-4 corresponds to the OpenFlow switch. Note that the communication nodes 10-1 to 10-4 are referred to as the "communication node 10" in the description below when there is no need to distinguish each of them.

Figure 3:
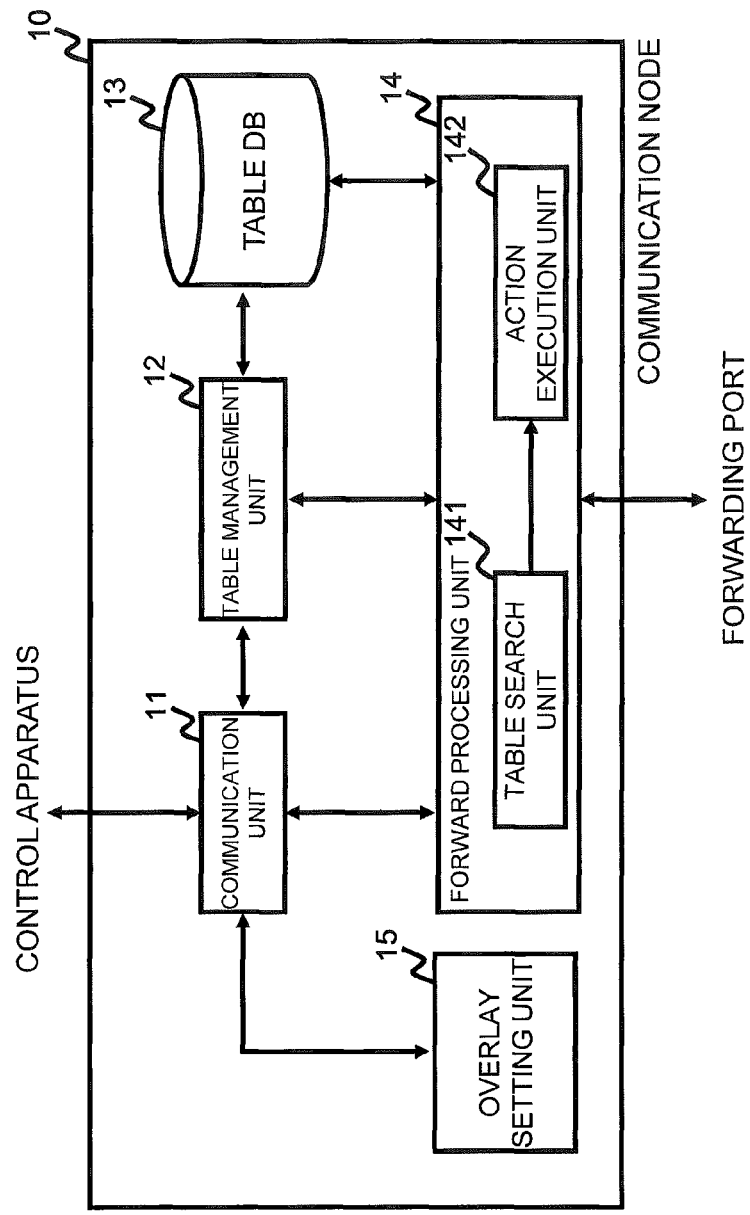
FIG. 3 is a block diagram showing an example of the internal configuration of a communication node 10.

FIG. 3 is a block diagram showing an example of the internal configuration of the communication node 10. The communication node 10 is constituted by including a communication unit 11, a table management unit 12, a table database (table DB) 13, a forward processing unit 14, and an overlay setting unit 15.

The communication unit 11 is means for communicating with the control apparatus 20 that sets a packet handling operation for the communication node 10. For instance, the communication unit 11 communicates with the control apparatus 20 using the OpenFlow protocol in Non-Patent Literature 2. The communication protocol between the communication unit 11 and the control apparatus 20, however, is not limited to the OpenFlow protocol.

Further, the communication unit 11 transmits an error message including various error codes to the control apparatus 20 when not being able to receive the setting of a packet handling operation successfully from the control apparatus 20. For instance, the error message is transmitted when a packet handling operation cannot be accepted due to a high load on the communication node 10 or when the resources of the database that stores packet handling operations are insufficient.

The table management unit 12 is means for managing a table stored in the table DB 13. More concretely, the table management unit 12 registers a packet handling operation specified by the control apparatus 20 in the table DB 13 and requests the control apparatus 20 to set a packet handling operation when the forward processing unit 14 notifies that a new packet has been received. Further, when an expiration condition for a packet handling operation stored in each table is satisfied, the table management unit 12 deletes or revoke this packet handling operation.

The table DB 13 is constituted by a database capable of storing at least one table that the forward processing unit 14 refers to when processing a received packet.

The forward processing unit 14 is constituted by including a table search unit 141 and an action execution unit 142. The table search unit 141 is means for searching a packet handling operation having a match field that matches a received packet in the table stored in the table DB 13. The action execution unit 142 is means for processing a packet according to the processing contents indicated in the instruction field of a packet handling operation searched by the table search unit 141. Further, the forward processing unit 14 notifies the table management unit 12 that no packet handling operation having a match field that matches the received packet is found when this is the case.

The table management unit 12 requests the control apparatus 20 to set a packet handling operation via the communication unit 11 when there is no packet handling operation corresponding to the received packet. Further, the forward processing unit 14 updates statistical information registered in the table DB 13 according to the packet processing.

When receiving an instruction on formation of an overlay network from the control apparatus 20 via the communication unit 11, the overlay setting unit 15 performs device configuration to form an overlay network according to the instruction. For instance, when the communication node 10 comprises a function as a packet transport node capable of setting a virtual circuit, the overlay setting unit 15 performs device configuration that encapsulates a received packet with a specified label.

Figure 4:
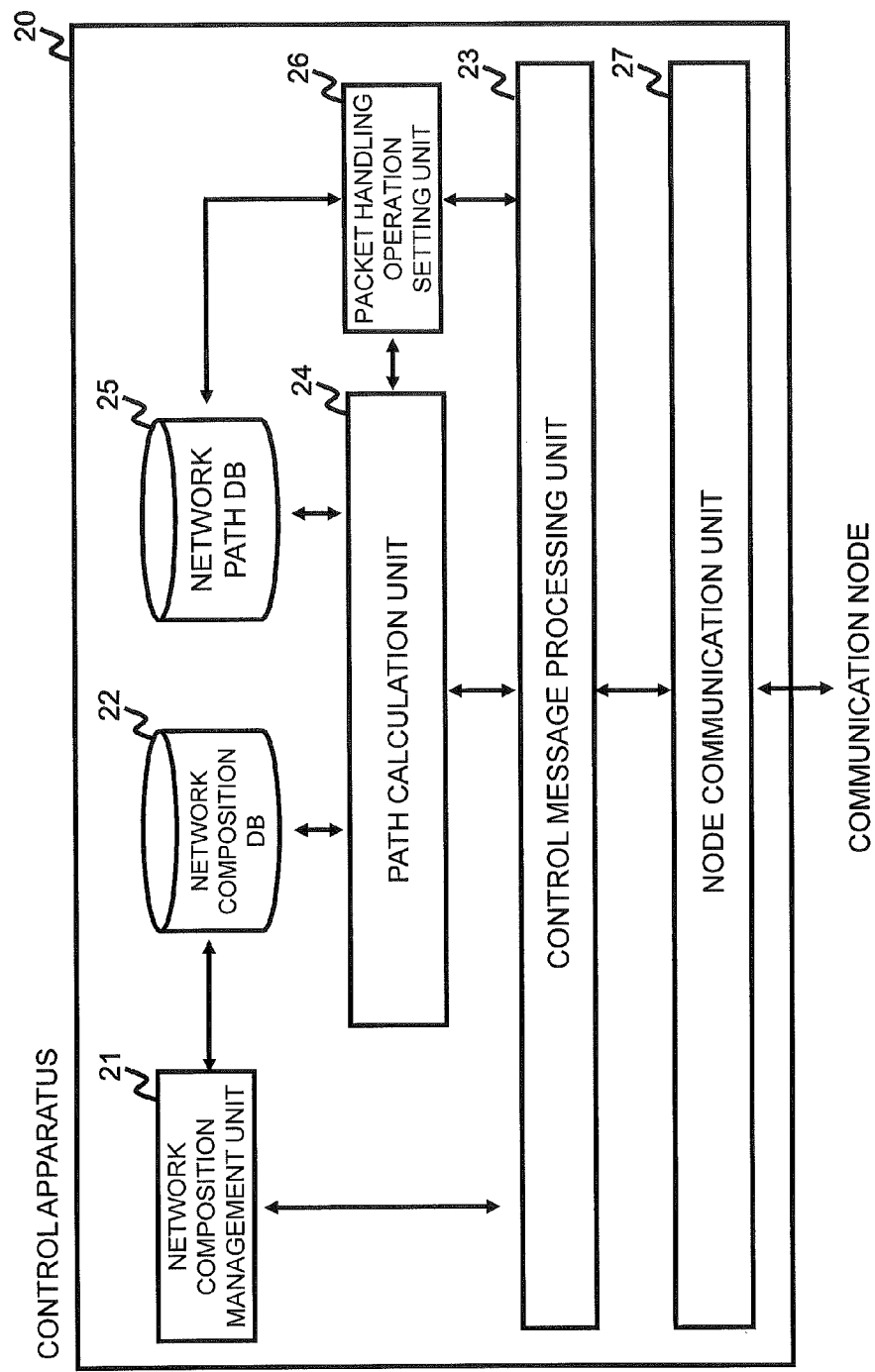
FIG. 4 is a block diagram showing an example of the internal configuration of a control apparatus 20.

FIG. 4 is a block diagram showing an example of the internal configuration of the control apparatus 20. The control apparatus 20 is constituted by including a network composition management unit 21, a network composition database (network composition DB) 22, a control message processing unit 23, a path calculation unit 24, a network path database (network path DB) 25, a packet handling operation setting unit 26, and a node communication unit 27 that communicates with the communication node 10.

The network composition management unit 21 manages the network composition of a communication system controlled by the control apparatus 20. More concretely, the network composition management unit 21 manages information on links from the communication node 10-1 to the communication node 10-4 and information on connection ports. The network composition management unit 21 may obtain these pieces of information by asking the communication node 10, or a network administrator may enter the information. The network composition management unit 21 registers the information on the composition of the controlled network in the network composition DB 22.

The control message processing unit 23 analyzes a control message received from the communication node 10 and hands the control message to the corresponding processing means in the control apparatus 20. For instance, when receiving a control message requesting a packet handling operation to be set, the control message processing unit 23 hands it to the path calculation unit 24, and when receiving an error message, the control message processing unit 23 hands the error message to the packet handling operation setting unit 26.

The path calculation unit 24 calculates a packet forwarding path for the communication node 10 on the basis of the network composition stored in the network composition DB 22. The path calculation unit 24 registers the calculated network path in the network path DB 25. Note that the path calculation unit 24 is included in the control apparatus 20 in the present exemplary embodiment, however, this does not mean that calculation related to packet forwarding path must be performed within the control apparatus 20. For instance, in a case where a network administrator calculates a packet forwarding path in advance and enters it to the control apparatus 20, the path calculation unit 24 that calculates a packet forwarding path is unnecessary. Or an apparatus capable of communicating with the control apparatus 20 and having the function of calculating a packet forwarding path may be provided, and the control apparatus 20 may request this apparatus to calculate a packet forwarding path and receive the calculated packet forwarding path.

The packet handling operation setting unit 26 manages packet handling operations to be set for the communication node 10. More concretely, the packet handling operation setting unit 26 generates a packet handling operation to be set for the communication node 10 on the basis of a packet forwarding path calculated by the path calculation unit 24 and set the generated packet handling operation for the communication nodes 10-1 to 10-4. At this time, the packet handling operation setting unit 26 does not set the packet handling operation for the communication nodes 10-1 to 10-4 in parallel, but it sequentially selects a communication node for which the packet handling operation is set and sets the packet handling operation for the selected communication node.

Further, each unit (processing means) of the control apparatus 20 shown in FIG. 4 can be realized by a computer program having a computer that constitutes these devices execute each processing described later using the hardware thereof.

Figure 5:
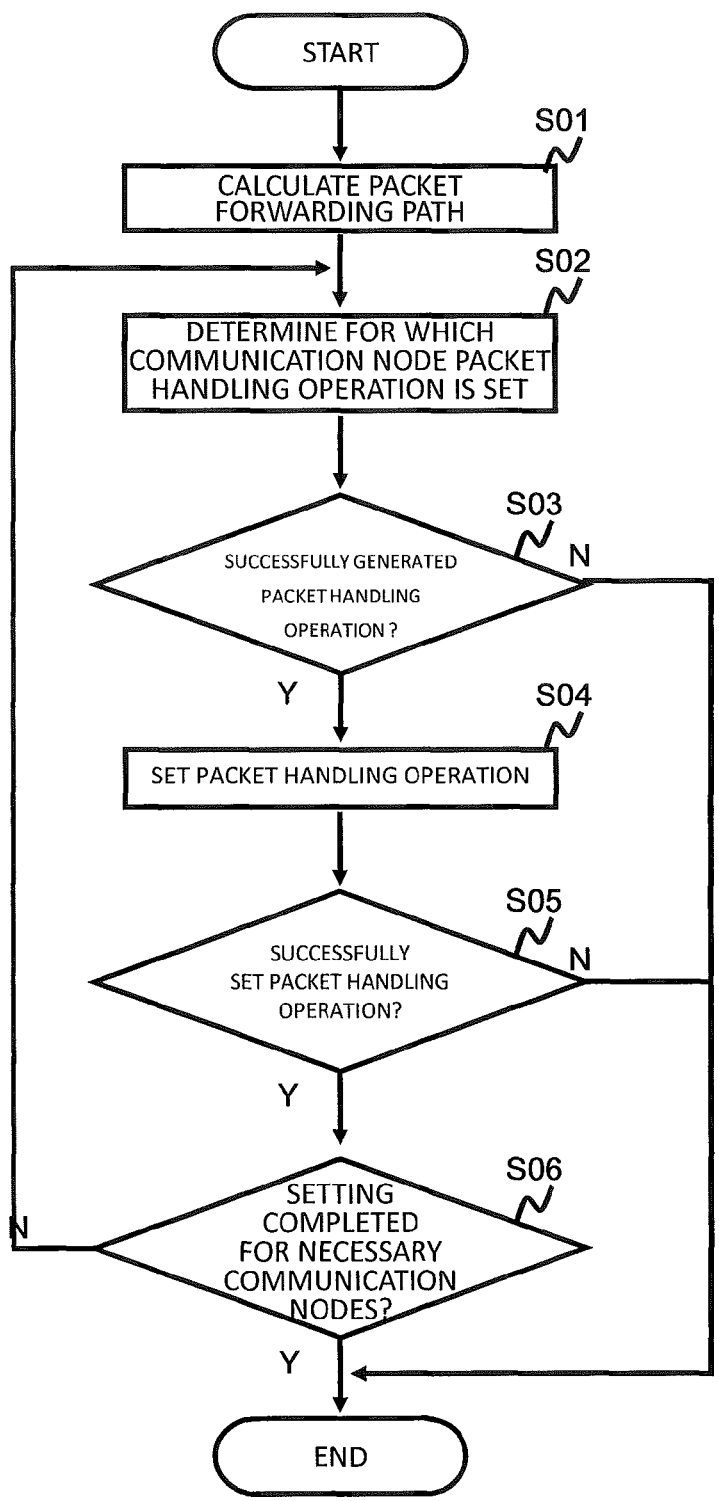
FIG. 5 is a sequence diagram for explaining an example of the operation of the control apparatus 20.

Next, the operation of the control apparatus 20 will be described with reference to the drawings. Note that FIG. 5 shows an example, and the operation of the control apparatus 20 is not limited to the sequence shown in FIG. 5. FIG. 5 is a sequence diagram for explaining an example of the operation of the control apparatus 20. Here, the operation of the control apparatus 20 when a packet is forwarded from the communication terminal 30-1 to the communication terminal 30-2, shown in FIG. 2, will be described. At this time, it is assumed that links are formed from the communication node 10-1 to the communication node 10-4, as shown in FIG. 2.

The operation of the control apparatus 20 shown in FIG. 5 may be triggered by an instruction from a network administrator at the start of a network operation or a packet handling operation setting request received from the communication node 10.

In step S01, the path calculation unit 24 calculates a path going through the communication nodes 10-1, 10-2, and 10-3 as a forwarding path for the packet transmitted by the communication terminal 30-1. The calculated forwarding path is registered in the network path DB 25.

In step S02, the packet handling operation setting unit 26 determines for which communication node 10 a packet handling operation is set on the basis of a forwarding path stored in the network path DB 25. At this time, the packet handling operation setting unit 26 decides on a communication node for which a packet handling operation is set by selecting a communication node from the communication nodes 10-1 to 10-3. The control apparatus 20 relating to the present exemplary embodiment randomly selects a particular communication node from the communication nodes for which a packet handling operation should be set and determines the selected communication node to be the communication node for which a packet handling operation is set. Let's assume that the packet handling operation setting unit 26 first selects the communication node 10-3 from the communication nodes 10-1 to 10-3 as the communication node for which a packet handling operation should be set. As soon as the communication node for which a packet handling operation should be set is determined, the packet handling operation setting unit 26 starts generating a packet handling operation for this communication node.

In step S03, the packet handling operation setting unit 26 determines whether or not the packet handling operation to be set for the communication node determined in the previous step has been successfully generated. There are various causes for a packet handling operation generation failure, and an example is insufficient resources within the control apparatus 20.

When the packet handling operation generation has failed ("No" in the step S03), the processing shown in FIG. 5 is ended. In other words, if the packet handling operation generation for the communication node 10-3 fails, the generation and setting of the packet handling operation for the other communication nodes 10-1 and 10-2 will not be performed.

If the packet handling operation generation is successful ("Yes" in the step S03), the packet handling operation setting unit 26 will try to set the packet handling operation for the communication node determined in the step S02 via the control message processing unit 23 and the node communication unit 27 (step S04).

In step S05, the packet handling operation setting unit 26 determines whether or not the setting of the packet handling operation in the previous step has been successful (whether or not the packet handling operation has been set normally). For instance, when receiving an error message from the communication node 10, the packet handling operation setting unit 26 determines that the setting of the packet handling operation has failed.

When the setting of the packet handling operation has failed ("No" in the step S05), the processing shown in FIG. 5 is ended. The generation and setting of the packet handling operation will not be performed for the other communication nodes 10-1 and 10-2 in this case as well if the setting of the packet handling operation for the communication node 10-3 has failed.

When the setting of the packet handling operation has been successful ("Yes" in the step S05), the packet handling operation setting unit 26 determines whether or not the setting of the packet handling operation has been completed for all the communication nodes 10 requiring the packet handling operation to be set therefor in order to realize a packet forwarding path (step S06). For instance, when the setting of the packet handling operation has been completed for the communication node 10-3 and the setting of the packet handling operation has not been tried for the communication nodes 10-1 and 10-2 ("No" in the step S06), the packet handling operation will be set for these communication nodes (the processing goes to the step S02). When the packet handling operation has been set for all the communication nodes 10 ("Yes" in the step S06), the packet handling operation setting unit 26 ends the processing shown in FIG. 5 (the processing of setting a packet forwarding path ends successfully).

As described, the control apparatus 20 selects a first communication node for which a packet handling operation is set from a plurality of communication nodes, and selects a second communication node for which the packet handling operation is set from communication nodes not having the packet handling operation set in response to the fact that it was possible to set the packet handling operation for the selected communication node. Further, the control apparatus 20 tries to set the packet handling operation for the second communication node selected. In other words, the control apparatus 20 selects a communication node for which a packet handling operation is set from a plurality of communication nodes, and does not set the packet handling operation for communication nodes for which the setting of the packet handling operation has not been tried in response to the fact that the setting of the packet handling operation for the selected communication node has failed.

Figure 6:
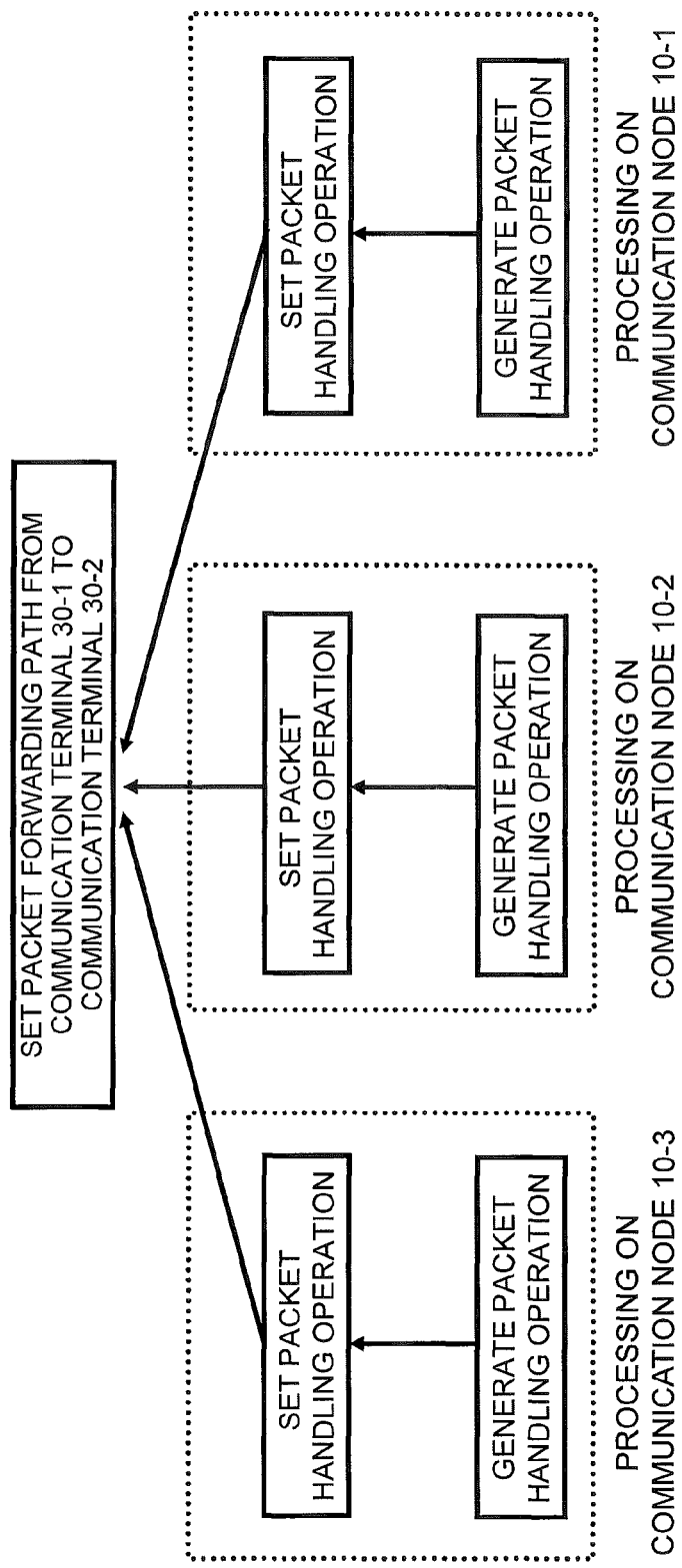
FIG. 6 is a drawing for explaining an example of the order of processes relating to the setting of a packet forwarding path.

FIG. 6 is a drawing for explaining an example of the order of processes relating to the setting of a packet forwarding path. As described above, unless the generation of a packet handling operation to be set for each communication node is successful, the control apparatus does not perform the subsequent processes (for instance the processes after the step S04 in FIG. 5). Further, unless the control apparatus 20 succeeds in setting a packet handling operation for each communication node, it does not perform the processes related to the packet handling operation to be set for other communication nodes (for instance the processes after the step S02 in FIG. 5). In other words, the control apparatus 20 performs processing according to a tree structure shown in FIG. 6 when setting a packet handling operation for each communication node in order to realize a packet forwarding path.

In FIG. 6, unless the generation of a packet handling operation for the communication node 10-3 is successful, a packet handling operation is not set for the communication node 10-3. Further, unless processing related to a packet handling operation for the communication node 10-3 is successful, processing related to a packet handling operation for the communication node 10-2 is not performed. Further, unless processing related to a packet handling operation for the communication node 10-1 is successful, processing that sets a packet forwarding path from the communication terminal 30-1 to the communication terminal 30-2 is not completed.

The control apparatus 20 relating to the present exemplary embodiment selects one communication node from a plurality of communication nodes, and generates and sets a packet handling operation. This, however, does not limit the decision on a communication node for which a packet handling operation is set. For instance, let's assume a case where a packet forwarding path is formed by nine communication nodes. In this case, the nine communication nodes are divided into three groups. More concretely, the nine communication nodes are assigned so that each group includes three communication nodes. Then, a group for which a packet handling operation is set may be randomly selected from the three groups, and a packet handling operation may be generated and set in parallel for the communication nodes included in the selected group. As described, a plurality of communication nodes may be divided into a plurality of groups that include at least one communication node, and a packet handling operation may be set in parallel for communication nodes included in a group selected from the divided groups.

Further, in the present exemplary embodiment, if the setting of a packet handling operation for a selected communication node fails, special processing will not be performed thereafter, and the processing of setting a packet forwarding path shown in FIG. 5 is ended. However, an action in response to the failure in setting a packet handling operation for the selected communication node can be performed.

Figure 7:
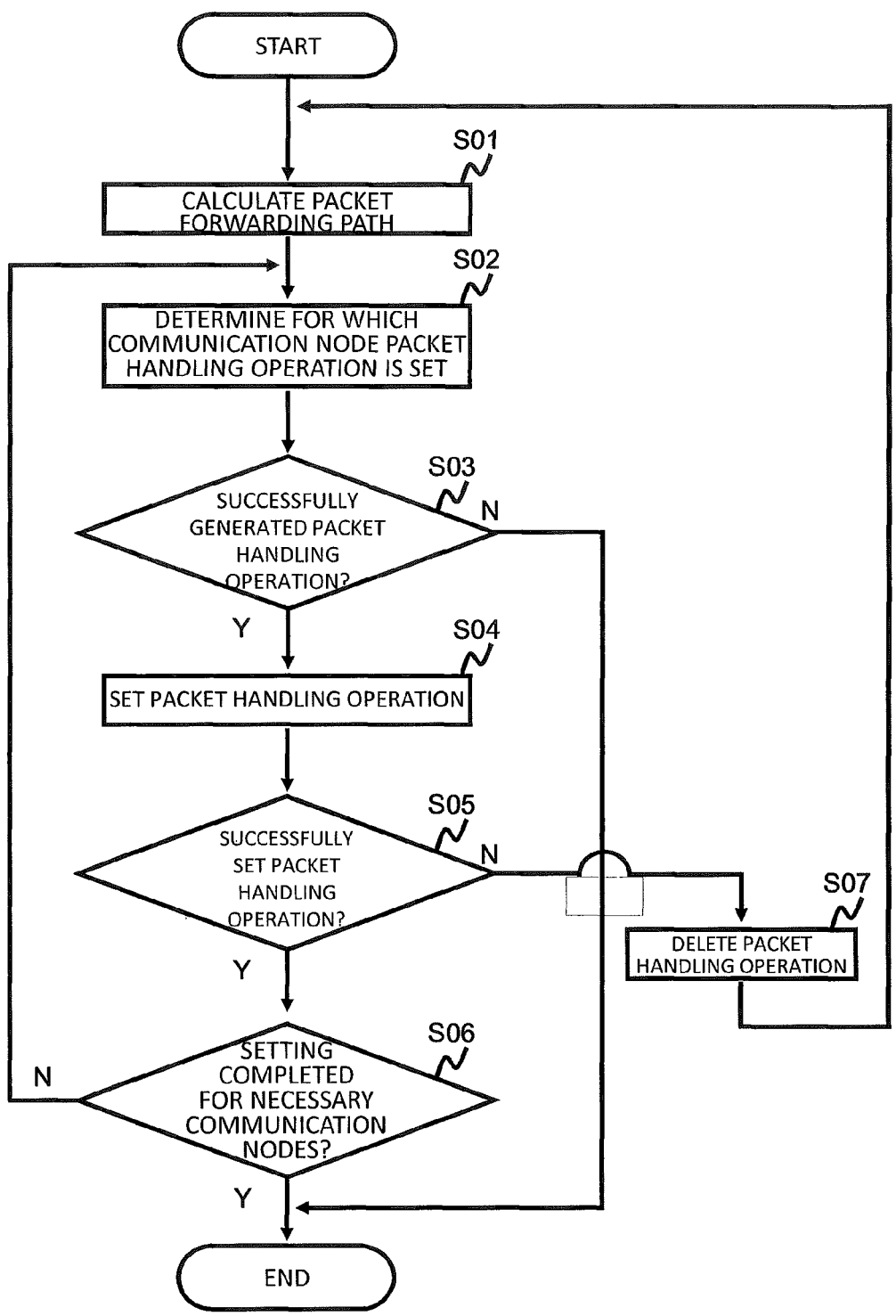
FIG. 7 is a sequence diagram for explaining another example of the operation of the control apparatus 20.

FIG. 7 is a sequence diagram for explaining another example of the operation of the control apparatus 20. In FIG. 7, a process relating to step S07 is added to the processes shown in FIG. 5.

In the step S07, when there is any communication node for which a packet handling operation has been set, the packet handling operation setting unit 26 deletes the packet handling operation set for this communication node. In other words, unless a packet handling operation is set successfully for all the communication nodes constituting a packet forwarding path, the packet handling operation individually set for each communication node is useless, and it is preferred that the packet handling operation be deleted. Further, the resources of the communication nodes can be released by deleting useless packet handling operations (the resources can be used efficiently).

Further, it is preferred that the path calculation unit 24 recalculate a packet forwarding path when the operation returns to the step S01 via the step S07. In other words, since a packet cannot be forwarded using the initially calculated packet forwarding path if the setting of a packet handling operation has failed for the selected communication node, the establishment of a new packet forwarding path will be explored.

The control apparatus 20 relating to the present exemplary embodiment reduces the possibility of wasting a packet handling operation already set, compared to a case where a packet handling operation is set for a plurality of communication nodes in parallel. The reason is that, after confirming that a packet handling operation has been successfully set for a communication node, the control apparatus sets the packet handling operation for other communication nodes.

[Exemplary Embodiment 2]

Next, a second exemplary embodiment will be described with reference to the drawings.

Since the internal configuration of a control apparatus 20a relating to the present exemplary embodiment is identical to that of the control apparatus 20 relating to the first exemplary embodiment, the explanation of the control apparatus 20a that corresponds to FIG. 4 will be omitted. Further, since the operation of the control apparatus 20a differs from that of control apparatus 20 in the process of the step S02 in FIG. 5, a process that corresponds to the step S02 in FIG. 5 will be described, but the explanations of the other processes will be omitted.

From a plurality of communication nodes for which a packet handling operation should be set, the control apparatus 20 sequentially selects a communication node on which the processing related to a packet handling operation is performed. On the other hand, the control apparatus 20a relating to the present exemplary embodiment selects (decides on) a communication node on which the processing related to a packet handling operation is performed according to a predetermined priority order.

FIG. 8 is a drawing showing an example of a priority order used by the control apparatus 20a. In FIG. 8, a plurality of communication nodes are divided into exit nodes, ingress nodes, and via nodes according to type, and a degree of priority is given to each type.

An exist node become the exit when a packet is forwarded from the controlled network to another network. For instance, in FIG. 2, when a packet is forwarded from the communication terminal 30-1 to the communication terminal 30-2, the communication node 10-3 corresponds to the exit node. An ingress node is the first node that receives a packet from another network. For instance, in the above example, the communication node 10-1 corresponds to the ingress node. A via node is a communication node required to realize a packet forwarding path and any node that is not the exit node or the ingress node. For instance, in the above example, the communication node 10-2 corresponds to the via node.

The control apparatus 20a gives a predetermined priority order to each of these types of communication nodes, and generates and sets a packet handling operation for communication nodes in order of priority.

In FIG. 8, since the exit node has the highest priority, processing related to a packet handling operation for the communication node 10-3 is performed first. Next, since the ingress node has a higher priority than the via node, processing related to a packet handling operation for the communication node 10-1 is performed. Finally, processing related to a packet handling operation for the communication node 10-2 corresponding to the via node is performed.

The priority order shown in FIG. 8 is merely an example and does not limit the decision on the priority order. For instance, the priority orders of the exit node and the ingress node may be reversed. Or the same priority order may be given to the exit node and the ingress node (but a priority higher than the via node is given) and the generation and setting of a packet handling operation may be performed for the exit node and the ingress node in parallel.

It is predicted that the amount of packets processed by the exit node and the ingress node located at both ends of a packet forwarding path is greater than the amount of packets processed by the via node. As a result, the load on the nodes located at both ends of a forwarding path is higher than that on the via node, and the setting of a packet handling operation is more likely to fail for these nodes. If the setting of a packet handling operation fails for the exit node or the ingress node after the packet handling operation has been set for the via node first, the setting of the packet handling operation for the via node will be wasted. Therefore, the control apparatus 20a relating to the present exemplary embodiment gives higher priorities to communication nodes having a high possibility of wasting a packet handling operation for other communication nodes when the setting of the packet handling operation fails, and decides on a communication node for which a packet handling operation is generated and set according to this priority order. As a result, the possibility of wasting an already set packet handling operation can be further reduced.

[Exemplary Embodiment 3]

Next, a third exemplary embodiment will be described in detail with reference to the drawings.

Since the internal configuration of a control apparatus 20b relating to the present exemplary embodiment is identical to those of the control apparatuses 20 and 20a, the explanation of the control apparatus 20b that corresponds to FIG. 4 will be omitted.

In the first and the second exemplary embodiments, links are assumed to be already formed among the communication nodes for which a packet handling operation should be set. In reality, however, necessary links are not always formed between communication nodes. For instance, links from the communication node 10-1 to the communication node 10-3 are already formed in FIG. 2, but there may be a case where the link between the communication node 10-2 and the communication node 10-3 is not formed.

Therefore, the control apparatus 20b relating to the present exemplary embodiment judges whether or not a necessary link is formed before generating and setting a packet handling operation for a communication node. If the link cannot be formed as a result of the judgment, a packet handling operation will not be set for the communication node.

Figure 9:
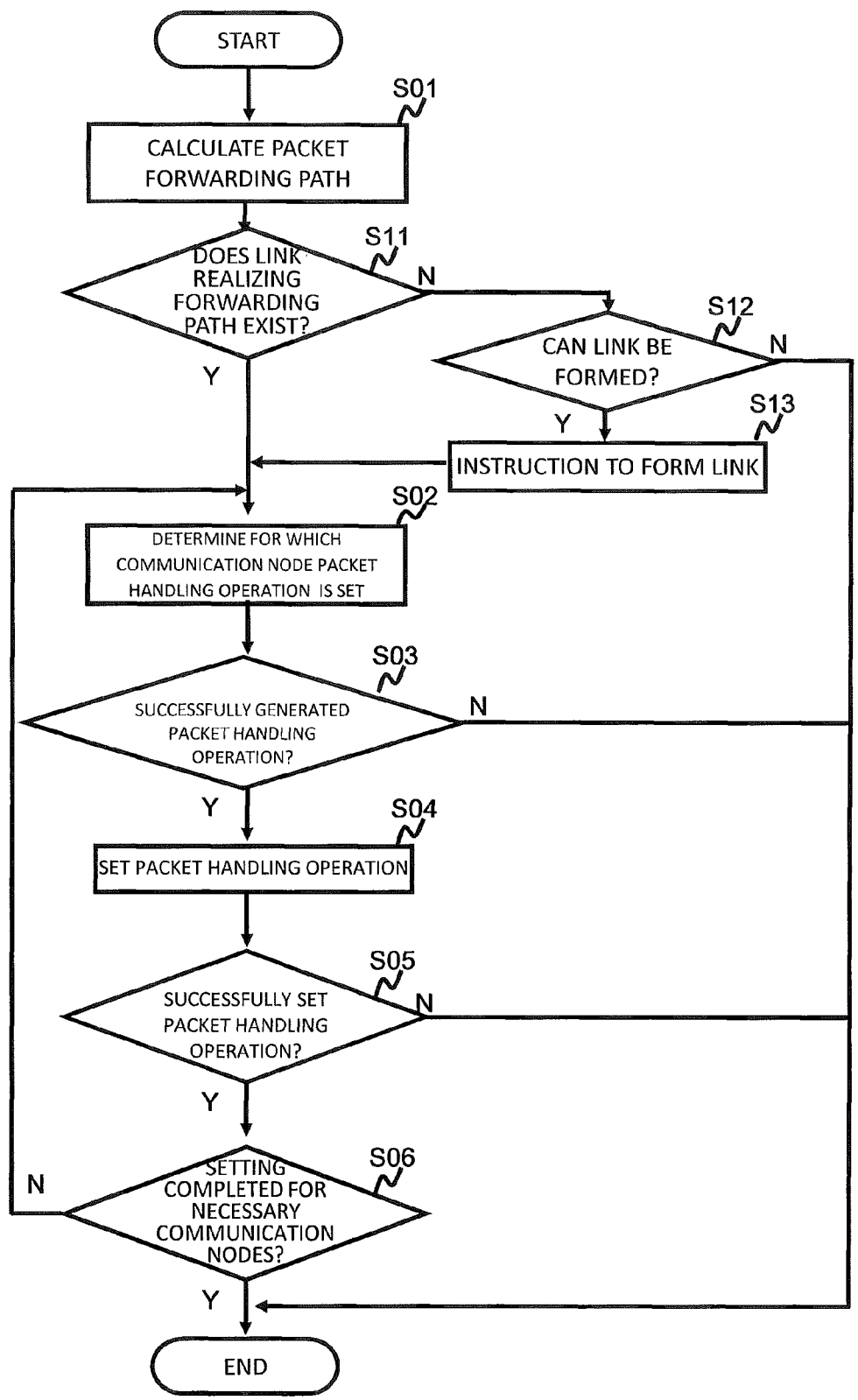
FIG. 9 is a sequence diagram for explaining an example of the operation of a control apparatus 20b relating to a third exemplary embodiment.

FIG. 9 is a sequence diagram for explaining an example of the operation of the control apparatus 20b. Here, the operation of the control apparatus 20 when a packet is forwarded from the communication terminal 30-1 to the communication terminal 30-2 shown in FIG. 2 will be described. At this time, it is assumed that no link is formed between the communication node 10-2 and the communication node 10-3.

The control apparatus 20b performs the processes relating to steps S11 to S13 after calculating a packet forwarding path (the step S01).

In the step S11, the path calculation unit 24 determines whether or not a link that realizes the forwarding path exists. More concretely, the path calculation unit 24 accesses the network composition DB 22 and confirms if at least one link is formed between the communication nodes included in the packet forwarding path.

If a link is formed ("Yes" in the step S11), the processes of the step S02 and the steps thereafter described using FIG. 5 are performed.

If no link is formed ("No" in the step S11), the path calculation unit 24 determines whether or not a link can be formed between the communication nodes that are missing a link (the step S12). For instance, when the resources of the communication node 10-2 are insufficient to form a link to the communication node 10-3, it is determined that a link cannot be formed between the communication nodes. When a link cannot be formed, the processing shown in FIG. 9 is ended.

When a link can be formed ("Yes" in the step S12), the path calculation unit 24 instructs the communication nodes 10-2 and 10-3 to form a link via the node communication unit 27. At this time, the path calculation unit 24 notifies the packet handling operation setting unit 26 that a packet forwarding path is generated. Upon receiving the notification, the packet handling operation setting unit 26 performs the processes of the step S02 and the steps thereafter described using FIG. 5.

As described above, the control apparatus 20b relating to the present exemplary embodiment determines whether or not a link is formed between communication nodes before generating and setting a packet handling operation for a communication node. Since a packet handling operation is neither generated nor set for a communication node when a link cannot be formed between the communication nodes, a useless packet handling operation is not set for a communication node. In other words, the possibility of wasting a set packet handling operation can be reduced.

[Exemplary Embodiment 4]

Next, a fourth exemplary embodiment will be described in detail with reference to the drawings.

In the first to the third exemplary embodiments described above, a packet handling operation is generated on the basis of a packet forwarding path and the packet handling operation is set for the communication nodes included in the packet forwarding path. However, there is a case where a packet handling operation is set for a communication node not on the basis of a packet forwarding path. In this case, too, if a packet handling operation is set for a plurality of communication nodes in parallel, an already set packet handling operation may get wasted.

In the present exemplary embodiment, as an example in which a packet handling operation is set for a plurality of communication nodes without being based on a packet forwarding path, a case where a virtual circuit (tunnel) is formed in a network and a tunnel is set up between communication nodes will be described.

Figure 10:
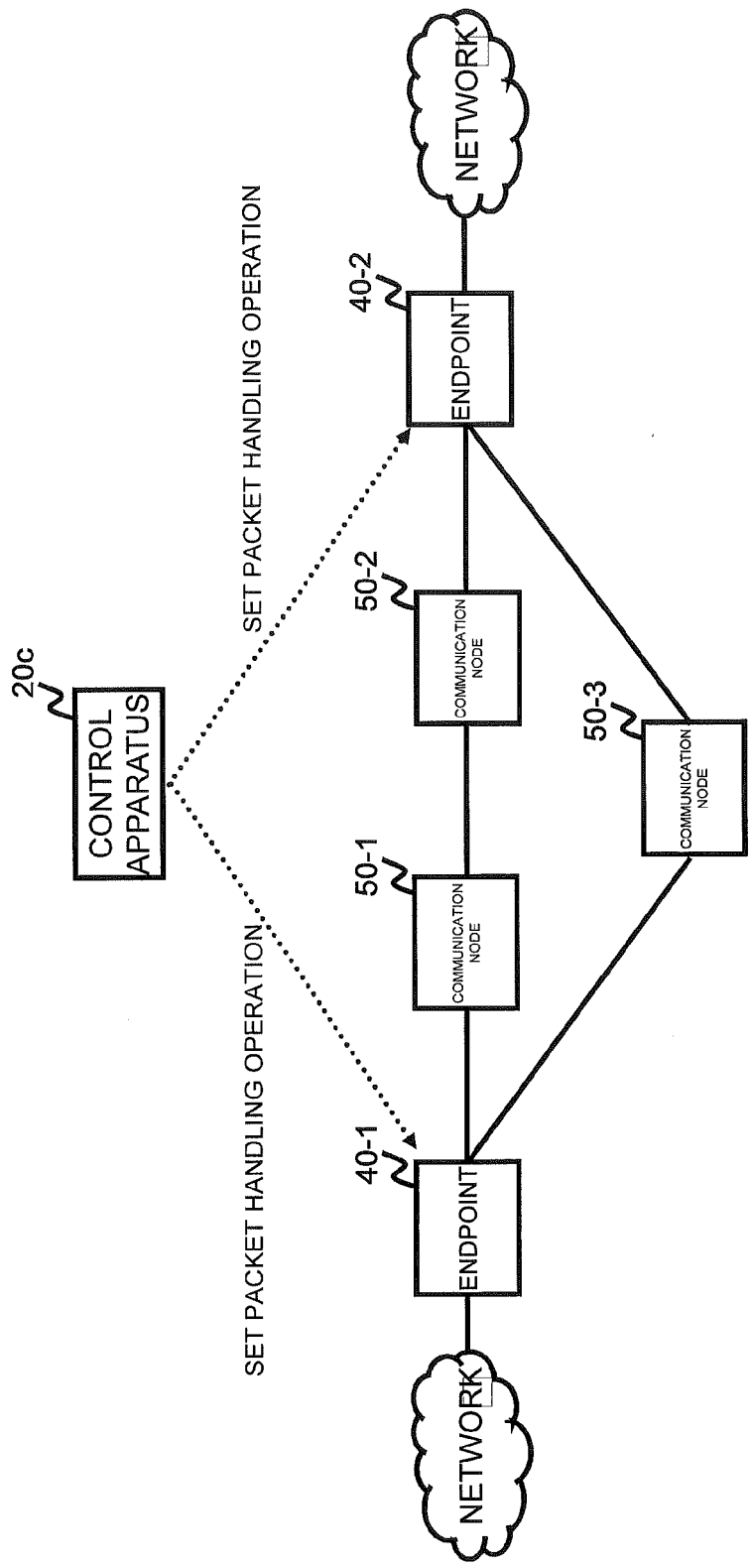
FIG. 10 is a drawing showing an example of a communication system relating to a fourth exemplary embodiment.

FIG. 10 is a drawing showing an example of a communication system relating to the present exemplary embodiment. FIG. 10 shows a composition including endpoints 40-1 and 40-2 that terminate a virtual circuit formed in a network, communication nodes 50-1 to 50-3, and a control apparatus 20c that controls at least the endpoints 40-1 and 40-2. Note that the endpoints 40-1 and 40-2 are referred to as the "endpoint 40" in the description below when there is no need to distinguish each of them. Similarly, the communication nodes 50-1 to 50-3 are referred to as the "communication node 50" when there is no need to distinguish each of them.

The endpoint 40 is a communication node that terminates the virtual circuit formed in the network. More concretely, the endpoint 40 supports MPLS-TP (Multi Protocol Label Switching-Transport Profile) and forms the virtual circuit between the endpoints 40-1 and 40-2. At this time, the endpoint 40 on the packet transmitting side encapsulates a received packet using the MPLS label when forwarding the packet. Upon receiving the encapsulated packet, the endpoint 40 on the receiving side cancels the encapsulation of (decapsulates) the packet using the MPLS label. Note that the tunneling technology that the endpoint 40 supports is MPLS-TS in the present exemplary embodiment, but the tunneling technology is not limited to MPLS-TS. The endpoint 40 may use other protocols to terminate a virtual circuit in the network.

The communication nodes 50-1 to 50-3 are communication nodes that forward the packet encapsulated by the endpoint 40. The communication nodes 50-1 to 50-3 may or may not be controlled by the control apparatus 20c.

Figure 11:
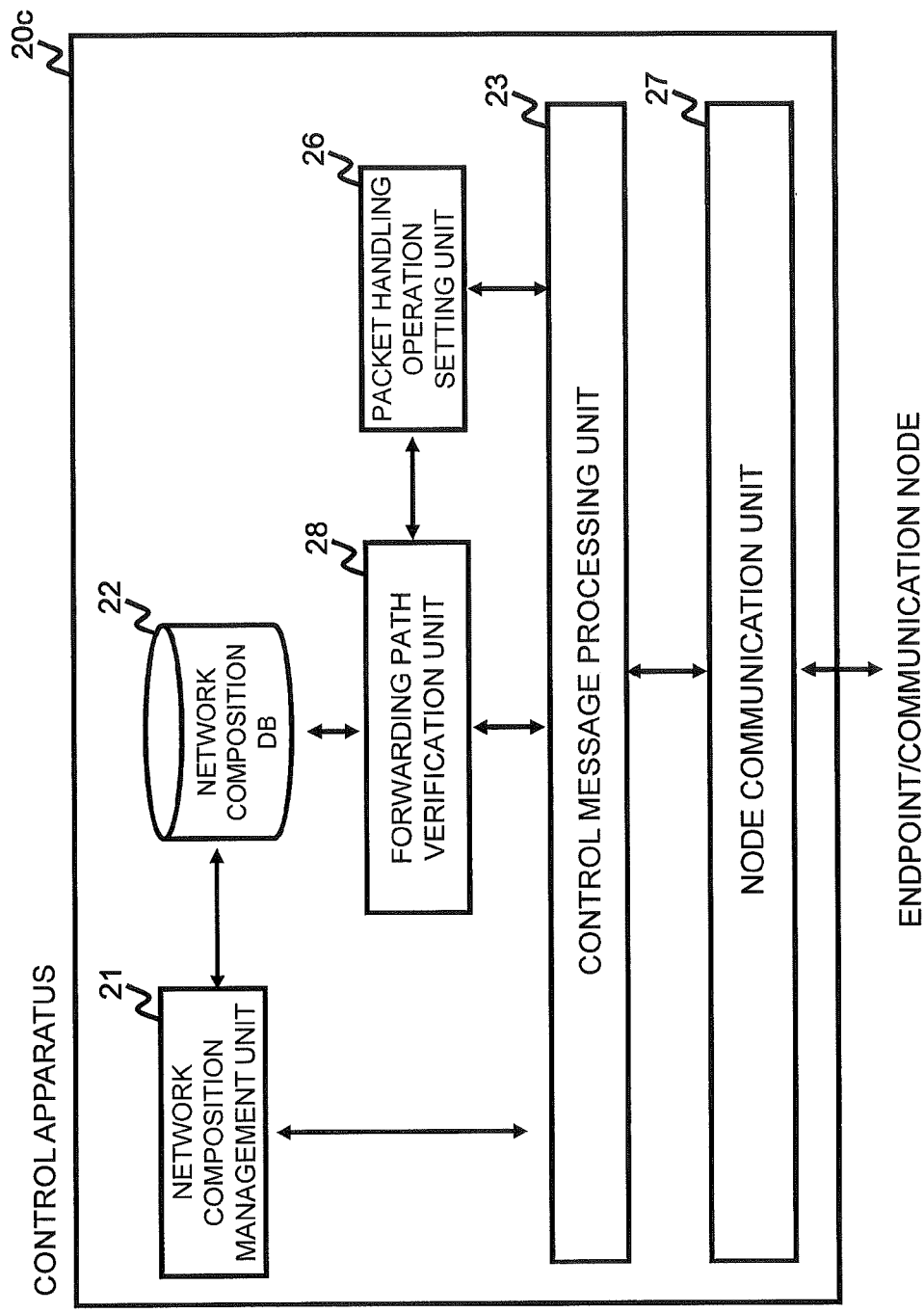
FIG. 11 is a block diagram showing an example of the internal configuration of a control apparatus 20c.

FIG. 11 is a block diagram showing an example of the internal configuration of the control apparatus 20c. The same signs are given to elements in FIG. 11 same as those in FIG. 4, and the explanations will be omitted.

The control apparatus 20c in FIG. 11 differs from the control apparatus 20 in FIG. 4 in that the control apparatus 20c comprises a forwarding path verification unit 28 instead of the path calculation unit 24, the operation of the packet handling operation setting unit 26 is different, and that the network path DB 25 is not required.

When the packet handling operation setting unit 26 receives an instruction, the instruction being made by a network administrator using a communication terminal not shown in FIG. 10, relating to the formation of a virtual circuit between the endpoints 40-1 and 40-2, the packet handling operation setting unit 26 sets a packet handling operation for realizing the instructed virtual circuit for the endpoints 40-1 and 40-2. More concretely, for the endpoints

40-1 and 40-2, the packet handling operation setting unit 26 sets the MPLS label used to encapsulate or decapsulate a packet.

The forwarding path verification unit 28 is means for verifying the presence of a communication node (resource) that forwards the encapsulated packet when the virtual circuit is formed between the endpoints 40-1 and 40-2. Upon receiving an inquiry from the packet handling operation setting unit 26, the forwarding path verification unit 28 verifies the presence of a communication node that forwards a packet included in the virtual circuit and returns the verification result to the packet handling operation setting unit 26. Further, by accessing the network composition DB 22 that stores information collected by the network composition management unit 21 from the endpoint 40 and the communication node 50, the forwarding path verification unit 28 calculates the network topology within the range of the information collected. Further, the forwarding path verification unit 28 responds to an inquiry from the packet handling operation setting unit 26 on the basis of the calculated network topology.

For instance, since there are the communication nodes 50-1 and 50-2 (or the communication node 50-3) for forwarding the packet encapsulated for the endpoint 40 in the network in FIG. 10, the forwarding path verification unit 28 returns a response that the communication nodes for forwarding the encapsulated packet exist between the endpoints 40-1 and 40-2 to the inquiry from the packet handling operation setting unit 26. On the other hand, for instance, when the communication nodes 50-1 and 50-3 do not exist in the network in FIG. 10, the forwarding path verification unit 28 returns a response that no communication node for forwarding the encapsulated packet exists.

The forwarding path verification unit 28 verified the presence of a communication node that forwards the encapsulated packet (confirmed the presence of a communication node that forwards the packet included in the virtual circuit) when receiving the inquiry from the packet handling operation setting unit 26. The forwarding path verification unit 28, however, may verify the presence of such a communication node in advance.

Figure 12:
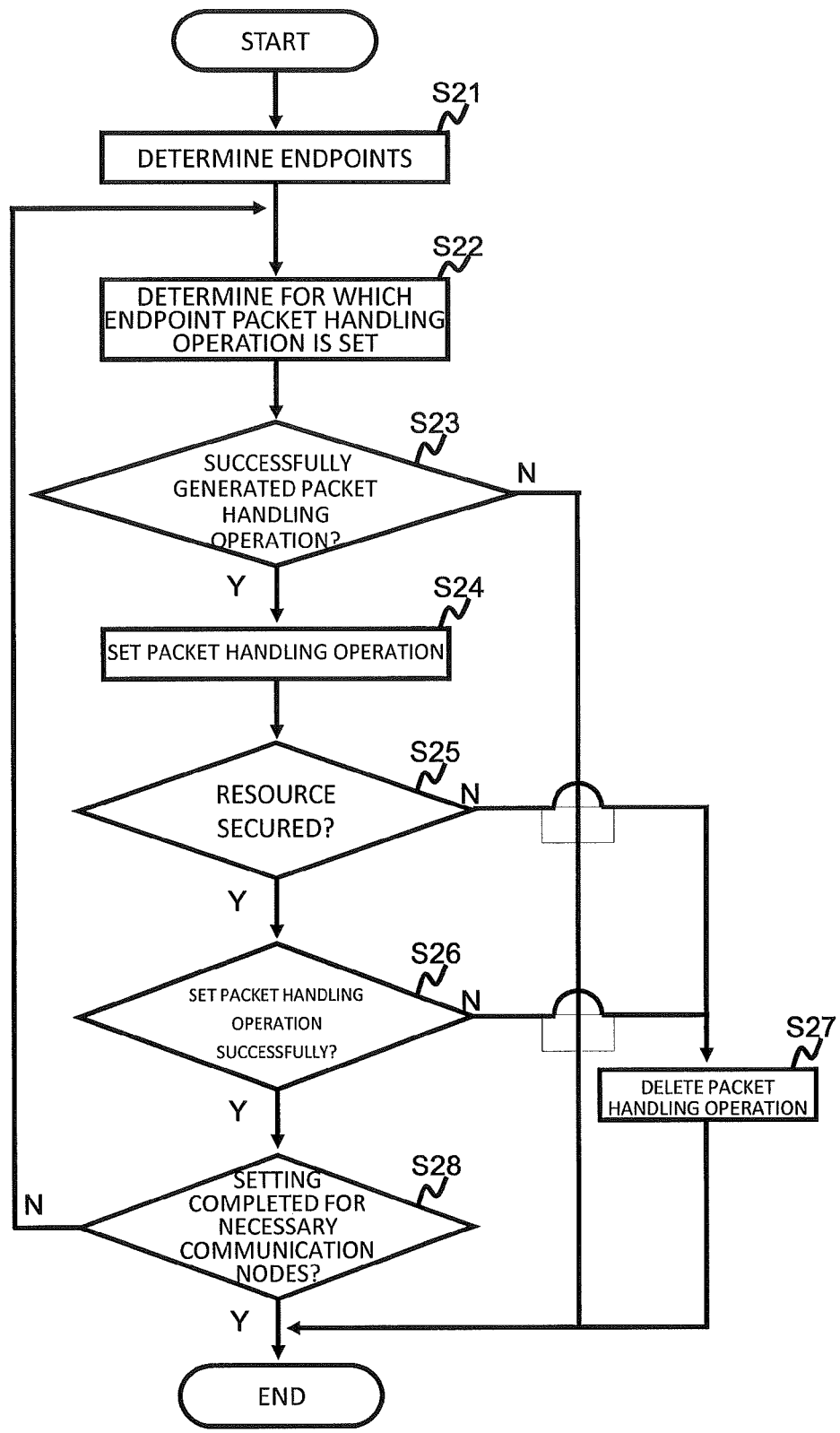
FIG. 12 is a sequence diagram for explaining an example of the operation of the control apparatus 20c.

FIG. 12 is a drawing for explaining an example of the operation of the control apparatus 20c. Here, the operation of the control apparatus 20c when a virtual circuit is formed between the endpoints 40-1 and 40-2 shown in FIG. 10 will be described.

In step S21, the packet handling operation setting unit 26 determines the endpoints of a virtual circuit formed in a network on the basis of information entered by a network administrator via the node communication unit 27. For instance, in the network shown in FIG. 10, the endpoints 40-1 and 40-2 are selected as the endpoints for which a packet handling operation should be set.

In step S22, out of the selected endpoints in the previous step, the packet handling operation setting unit 26 decides on an endpoint to set a packet handling operation for. At this time, the packet handling operation setting unit 26 selects one of the endpoints on both ends as the endpoint for which a packet handling operation is preferentially set. For instance, in FIG. 10, the packet handling operation setting unit 26 selects the endpoint 40-1 as the endpoint for which a packet handling operation is preferentially set. Note that the endpoint for which a packet handling operation is preferentially set is not limited to endpoints on the transmission side, but a packet handling operation may be preferentially set for an endpoint on the reception side. After deciding on the endpoint for which a packet handling operation should be set, the packet handling operation setting unit 26 starts generating a packet handling operation to be set for this endpoint.

In step S23, the packet handling operation setting unit 26 determines whether or not a packet handling operation to be set for the endpoint selected in the previous step has been successfully generated.

When the generation of a packet handling operation fails ("No" in the step S23), the processing shown in FIG. 12 is ended. For instance, if the generation of a packet handling operation for the endpoint 40-1, selected as the endpoint for which a packet handling operation is preferentially set, fails, a packet handling operation will not be generated or set for the other endpoint 40-2.

When the generation of a packet handling operation is successful ("Yes" in the step S23), the packet handling operation setting unit 26 tries to set the packet handling operation for the endpoint selected in the step S22 via the control message processing unit 23 and the node communication unit 27 (step S24).

In step S25, the packet handling operation setting unit 26 confirms the presence of a communication node that forwards the encapsulated packet (confirms whether or not a resource has been secured). More concretely, the packet handling operation setting unit inquires the forwarding path verification unit 28 if any communication node that forwards the packet exists between the two endpoints 40. Upon receiving the inquiry, the forwarding path verification unit 28 verifies the presence of a communication node that forwards a packet included in the virtual circuit and returns the verification result to the packet handling operation setting unit 26.

When a resource is not secured (no communication node exists) ("No" in the step S25), the packet handling operation setting unit 26 deletes the packet handling operation set for the endpoint for which the setting of the packet handling operation has been completed (step S27). In other words, if there is no communication node that forwards the encapsulated packet, the packet handling operation set for the endpoint is useless, and such a packet handling operation should be deleted. After the packet handling operation has been deleted, the processing shown in FIG. 12 is ended.

When a resource is secured ("Yes" in the step S25), the packet handling operation setting unit 26 determines whether or not the setting of the packet handling operation in the step S24 has been successful (the packet handling operation has been normally set) (step S26).

When the setting of the packet handling operation has failed ("No" in the step S26), the processing shown in FIG. 12 is ended after the packet handling operation already set has been deleted (the step S27). For instance, if the setting of the packet handling operation for the endpoint 40-1, for which a packet handling operation is preferentially set, fails, the packet handling operation will be not generated or set for the other endpoint 40-2.

When the setting of the packet handling operation has succeeded ("Yes" in the step S26), the packet handling operation setting unit 26 determines whether or not the setting of the packet handling operation has been completed for all the endpoints for which the packet handling operation needs to be set in order to form the virtual circuit in the network (step S28). For instance, when the packet handling operation has been set for the endpoint 40-1, but it has not been set for the endpoint 40-2 ("No" in the step S28), the packet handling operation is set for the endpoint 40-2 (the operation moves to the step S22). On the other hand, if the packet handling operation has been set for the endpoint 40-2 as well ("Yes" in the step S28), the packet handling operation setting unit 26 ends the processing in FIG. 12 (the processing of setting a packet handling operation for the endpoints ends successfully).

Note that the operation of the control apparatus 20c shown in FIG. 12 is an example, and the order of each process shown in FIG. 12 is not limited thereto. For instance, whether or not a communication node that forwards the packet encapsulated by the endpoint exists may be verified before a packet handling operation is set for this endpoint.

Figure 13:
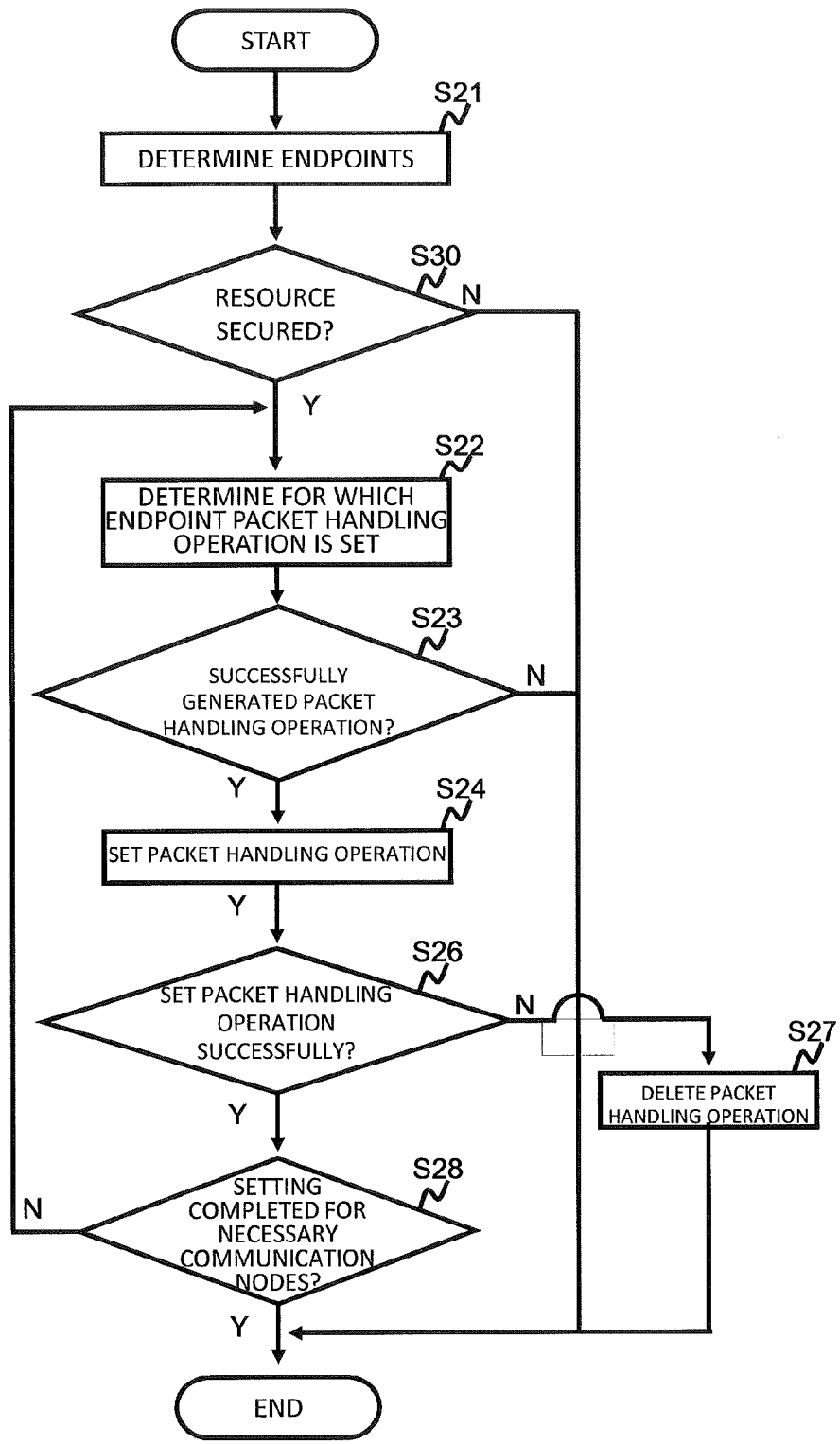
FIG. 13 is a sequence diagram for explaining another example of the operation of the control apparatus 20c.

FIG. 13 is a sequence diagram for explaining another example of the operation of the control apparatus 20c. The sequence diagram shown in FIG. 13 differs from the one in FIG. 12 in that the confirmation of securing a resource in the step S25 in FIG. 12 is performed in step S30 in FIG. 13, and the process of deleting the packet handling operation when the securing of a resource cannot be confirmed does not exist in FIG. 13.

As shown in FIG. 13, by verifying whether or not a communication node that forwards the encapsulated packet exists after the endpoints of the virtual circuit formed in the network are determined (immediately after the step S21), the packet handling operation set for the endpoint can be prevented from being wasted. If there is no communication node that forwards the encapsulated packet, the set packet handling operation will be wasted regardless of whether or not the setting of the packet handling operation for the endpoint is successful. Further, by verifying the presence of such a communication node first, the process of deleting the packet handling operation already set becomes unnecessary.

Further, an apparatus capable of communicating with the control apparatus 20c and having a function of verifying the presence of a communication node that forwards a packet included in the virtual circuit may be provided, and the control apparatus 20c may inquire this apparatus about securing a resource and receive the verification result.

As described, the control apparatus 20c determines the order of priority among the endpoints forming a virtual circuit in a network and set a packet handling operation therefor. In other words, when the setting of a packet handling operation for an endpoint, for which the setting of a packet handling operation is tried first, fails, a packet handling operation is not set for the remaining endpoint. As a result, the possibility of wasting the setting of a packet handling operation for an endpoint can be reduced, compared with a case where a packet handling operation is set in parallel for the endpoints at both ends. Further, the control apparatus 20c sets a packet handling operation for an endpoint while verifying the presence of a communication node that forwards an encapsulated packet. The setting of a packet handling operation for the endpoint that terminates a virtual circuit will be wasted if there is no communication node that forwards the encapsulated packet. By having the control apparatus 20c simultaneously verify the presence of a communication node, the possibility of wasting the setting of a packet handling operation for an endpoint can be reduced further.

[Exemplary Embodiment 5]

Next, a fifth exemplary embodiment will be described in detail with reference to the drawings.

In the present exemplary embodiment, as an example in which a packet handling operation is set for a plurality of communication nodes not on the basis of a packet forwarding path, a case where a packet handling operation is set for redundant communication nodes will be described.

For the purpose of improving the reliability and availability of a network, communication nodes are sometimes made redundant. In other words, by using a plurality of communication nodes having redundant functions, communication nodes can be made redundant. For instance, when there are two redundant communication nodes, one of these communication nodes is operated as an active communication node while the other communication node is operated as a standby communication node. The reliability of a network can be improved by replacing the active communication node with the standby communication node when a failure occurs in the active communication node.

Here, a control apparatus needs to set the same packet handling operation for these redundant communication nodes. At this time, if the control apparatus sets a packet handling operation for a plurality of redundant communication nodes in parallel, the set packet handling operation may be wasted. Therefore, when setting the same packet handling operation for redundant communication nodes, a control apparatus 20d relating to the present exemplary embodiment sets the packet handling operation for the redundant communication nodes in order of priority.

Figure 14:
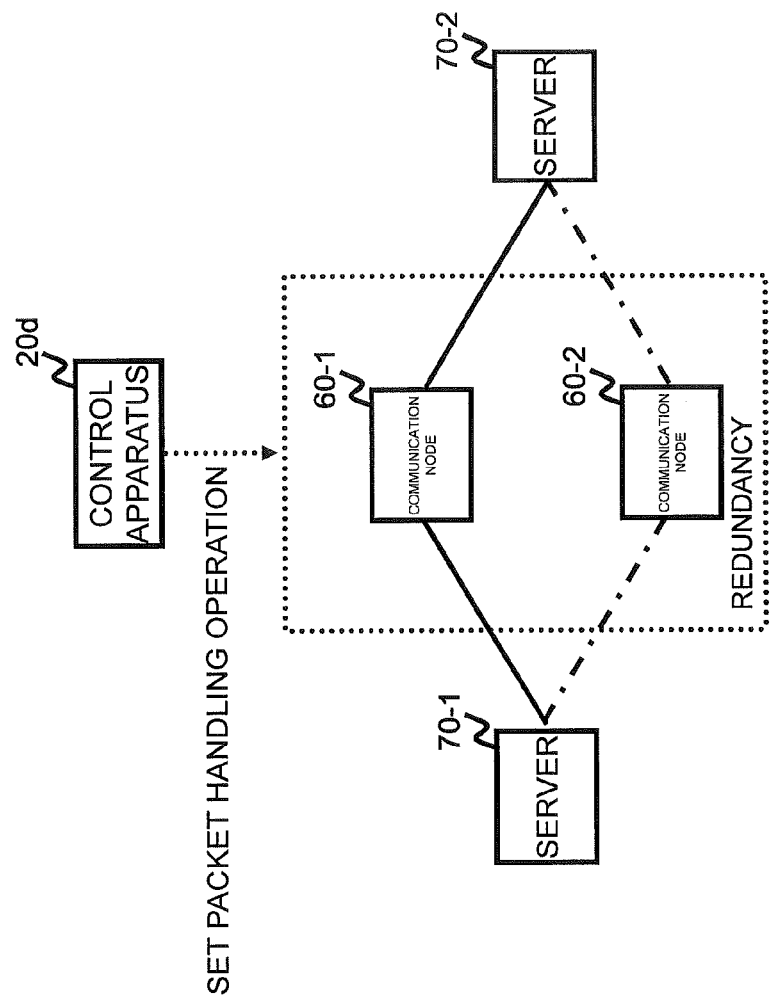
FIG. 14 is a drawing showing an example of a communication system relating to a fifth exemplary embodiment.
Figure 15:
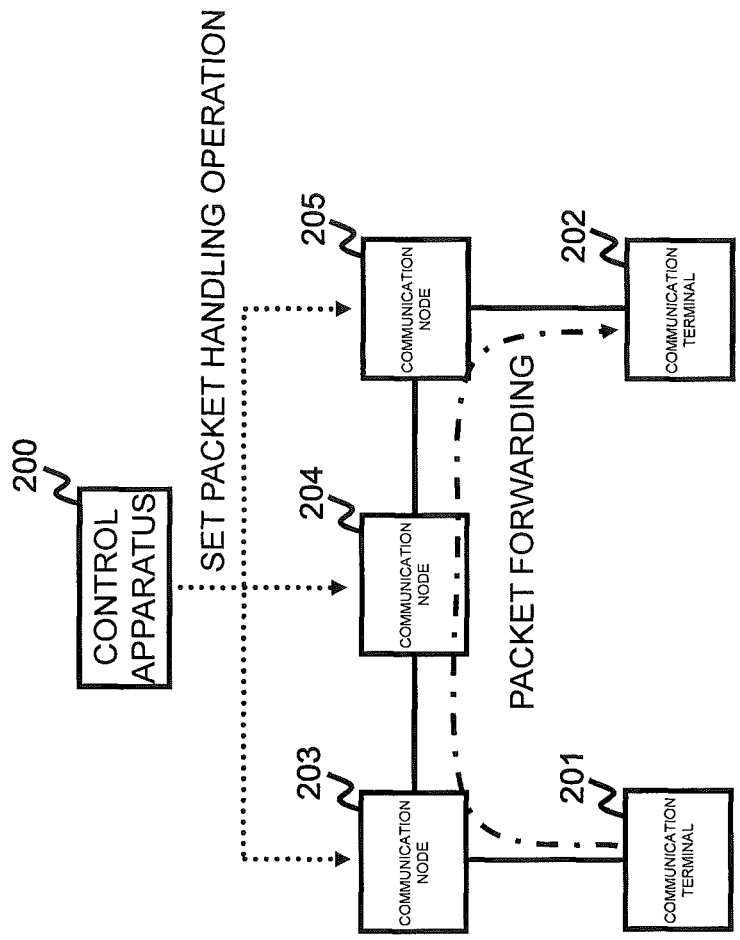
FIG. 15 is a drawing for explaining a problem when a packet handling operation is set in parallel.

FIG. 14 is a drawing showing an example of a communication system relating to the present exemplary embodiment. In FIG. 14, the control apparatus 20d controls a plurality of redundant communication nodes 60-1 and 60-2. Note that the communication nodes 60-1 and 60-2 are referred to as the "communication node 60" in the description below when there is no need to distinguish each of them.

Each of the two communication nodes 60 is made redundant using a redundancy protocol and for instance forwards a packet transmitted/received by servers 70-1 and 70-2. Note that apparatuses connected to the two communication nodes 60 may be any apparatus without being limited to servers. Further, the communication node 60-1 operates as an active communication node, and the communication node 60-2 operates as a standby communication node.

As described above, the control apparatus 20d needs to set the same packet handling operation when setting a packet handling operation for the redundant communication nodes 60. At this time, the control apparatus 20d preferentially sets the packet handling operation for an active communication node rather than set the packet handling operation for the communication nodes 60-1 and 60-2 in parallel. For instance, in the network shown in FIG. 14, in response to the fact that the setting of the packet handling operation for the active communication node 60-1 was successful, the packet handling operation is set for the standby communication node 60-2. On the other hand, when the setting of the packet handling operation for the active communication node 60-1 fails, the packet handling operation is not set for the standby communication node 60-2. This is because the setting of the packet handling operation for the standby communication node 60-2 is meaningful only when the setting of the packet handling operation for the active communication node 60-1 is successful.

Further, the reason for preferentially setting a packet handling operation for an active communication node when the packet handling operation is set for redundant communication nodes is the assumption that the control apparatus 20d cannot instruct switching from the active communication node to a standby communication node. In a case where the control apparatus 20d is able to switch from the active communication node to the standby one, a packet handling operation already set can be effectively utilized by activating a communication node for which the packet handling operation has been successfully set.

As described, when setting the same packet handling operation for redundant communication nodes, the control apparatus 20d preferentially sets the packet handling operation for an active communication node. In other words, when the setting of the packet handling operation for the active communication node fails, the control apparatus 20d does not set the packet handling operation for a standby communication node. As a result, the possibility of wasting the setting of a packet handling operation can be reduced.

Some or all of the exemplary embodiments described above can be described as below without being limited thereto.

[Mode 1]

As the control apparatus relating to the first aspect.

[Mode 2]

The control apparatus in Mode 1, wherein the packet handling operation setting unit selects another communication node for which the packet handling operation is set from communication nodes other than the selected communication node out of the plurality of communication nodes in response to the fact that it was possible to set the packet handling operation for the selected communication node.

[Mode 3]

The control apparatus in Mode 1 or 2, wherein the packet handling operation setting unit does not set the packet handling operation for communication nodes other than the selected communication node out of the plurality of communication nodes in response to the fact that it was not possible to set the packet handling operation for the selected communication node.

[Mode 4]

The control apparatus in Mode 3, wherein the packet handling operation setting unit deletes the set packet handling operation from a communication node for which the packet handling operation has been set out of the plurality of communication nodes in response to the fact that it was not possible to set the packet handling operation for the selected communication node.

[Mode 5]

The control apparatus according to any one of Modes 1 to 4, wherein the packet handling operation setting unit sets the packet handling operation for a communication node selected from a plurality of communication nodes included in a forwarding path of a packet.

[Mode 6]

The control apparatus according to any one of Modes 3 to 5 further comprising a path calculation unit that calculates a forwarding path of the packet, wherein the path calculation unit recalculates a forwarding path of the packet in response to the fact that it was not possible to set the packet handling operation for the communication node selected by the packet handling operation setting unit.

[Mode 7]

The control apparatus in Mode 5 or 6, wherein the packet handling operation setting unit selects a communication node for which the packet handling operation is set from the plurality of communication nodes on the basis of priority.

[Mode 8]

The control apparatus in Mode 7, wherein a higher priority is given to communication nodes located at both ends of the forwarding path out of the plurality of communication nodes than to communication nodes other than the communication nodes located at both ends.

[Mode 9]

The control apparatus according to any one of Modes 1 to 6, wherein the packet handling operation setting unit randomly selects a communication node for which the packet handling operation is set from the plurality of communication nodes.

[Mode 10]

The control apparatus according to any one of Modes 1 to 9, wherein the packet handling operation setting unit does not set the packet handling operation for the selected communication node in response to the fact that the packet handling operation corresponding to the selected communication node cannot be generated.

[Mode 11]

The control apparatus according to any one of Modes 1 to 10, wherein the packet handling operation setting unit does not set the packet handling operation for the selected communication node in response to the fact that no link exists among the plurality of communication nodes.

[Mode 12]

The control apparatus according to any one of Modes 1 to 11, wherein the packet handling operation setting unit sets the packet handling operation in parallel for communication nodes included in a group selected from a plurality of groups that includes at least one of the plurality of communication nodes.

[Mode 13]

The control apparatus according to any one of Modes 1 to 4, wherein the packet handling operation setting unit sets the packet handling operation for a communication node that terminates a virtual circuit in response to the fact that it was possible to set the packet handling operation for another communication node selected from two communication nodes that terminate the virtual circuit.

[Mode 14]

The control apparatus in Mode 13, wherein the packet handling operation setting unit sets the packet handling operation for a communication node that terminates the virtual circuit when a communication node that forwards a packet included in the virtual circuit exists.

[Mode 15]

The control apparatus in Mode 14 further comprising a forwarding path verification unit that verifies a presence of a communication node that forwards a packet included in the virtual circuit, wherein the packet handling operation setting unit determines whether or not to set the packet handling operation for a communication node that terminates the virtual circuit according to a result obtained by asking the forwarding path verification unit about the presence of a communication node that forwards a packet included in the virtual circuit.

[Mode 16]

The control apparatus according to any one of Modes 1 to 4, wherein the packet handling operation setting unit selects an active communication node from a plurality of redundant communication nodes and sets the packet handling operation for a standby communication node out of the plurality of redundant communication nodes in response to the fact that it was possible to set the packet handling operation for the active communication node.

[Mode 17]

As the control apparatus control method relating to the second aspect.

[Mode 18]

The control apparatus control method in Mode 17, wherein another communication node for which the packet handling operation is set is selected from communication nodes other than the selected communication node out of the plurality of communication nodes in the step of setting the packet handling operation in response to the fact that it was possible to set the packet handling operation for the selected communication node.

[Mode 19]

The control apparatus control method in Mode 17 or 18 further comprising a step of deleting the set packet handling operation from a communication node for which the packet handling operation has been set out of the plurality of communication nodes in response to the fact that it was not possible to set the packet handling operation for the selected communication node.

[Mode 20]

The control apparatus control method according to any one of Modes 17 to 19 further comprising a step of recalculating a forwarding path of the packet in response to the fact that it was not possible to set the packet handling operation for the communication node selected in the step of setting the packet handling operation.

[Mode 21]

The control apparatus control method according to any one of Modes 17 to 20, wherein a communication node for which the packet handling operation is set is selected from the plurality of communication nodes on the basis of priority in the step of selecting a communication node.

[Mode 22]

The control apparatus control method according to any one of Modes 17 to 21, wherein the packet handling operation is not set for the selected communication node in the step of setting the packet handling operation in response to the fact that the packet handling operation corresponding to the selected communication node cannot be generated.

[Mode 23]

The control apparatus control method according to any one of Modes 17 to 22, wherein the packet handling operation is not set for the selected communication node in the step of setting the packet handling operation in response to the fact that no link exists among the plurality of communication nodes.

[Mode 24]

The control apparatus control method according to any one of Modes 17 to 20, wherein the packet handling operation is set for a communication node that terminates a virtual circuit in the step of setting the packet handling operation in response to the fact that it was possible to set the packet handling operation for another communication node selected from two communication nodes that terminate the virtual circuit.

[Mode 25]

The control apparatus control method in Mode 24, wherein the packet handling operation is set for a communication node that terminates the virtual circuit in the step of setting the packet handling operation when a communication node that forwards a packet included in the virtual circuit exists.

[Mode 26]

The control apparatus control method in Mode 25 further comprising a forwarding path verification step of verifying a presence of a communication node that forwards a packet included in the virtual circuit, wherein whether or not to set the packet handling operation for a communication node that terminates the virtual circuit is determined in the step of setting the packet handling operation according to a verification result in the forwarding path verification step.

[Mode 27]

The control apparatus control method according to any one of Modes 17 to 20, wherein an active communication node is selected from a plurality of redundant communication nodes and the packet handling operation is set for a standby communication node out of the plurality of redundant communication nodes in the step of setting the packet handling operation in response to the fact that it was possible to set the packet handling operation for the active communication node.

[Mode 28]

As the program relating to the third aspect.

[Mode 29]

The program in Mode 28, wherein another communication node for which the packet handling operation is set is selected from communication nodes other than the selected communication node out of the plurality of communication nodes in the process of setting the packet handling operation in response to the fact that it was possible to set the packet handling operation for the selected communication node.

[Mode 30]

The program in Mode 28 or 29 having the computer further execute a process of deleting the set packet handling operation from a communication node for which the packet handling operation has been set out of the plurality of communication nodes in response to the fact that it was not possible to set the packet handling operation for the selected communication node.

[Mode 31]

The program according to any one of Modes 28 to 30 having the computer further execute a process of recalculating a forwarding path of the packet in response to the fact that it was not possible to set the packet handling operation for the communication node selected in the process of setting the packet handling operation.

[Mode 32]

The program according to any one of Modes 28 to 31, wherein a communication node for which the packet handling operation is set is selected from the plurality of communication nodes on the basis of priority in the process of selecting a communication node.

[Mode 33]

The program according to any one of Modes 28 to 32, wherein the packet handling operation is not set for the selected communication node in the process of setting the packet handling operation in response to the fact that the packet handling operation corresponding to the selected communication node cannot be generated.

[Mode 34]

The program according to any one of Modes 28 to 33, wherein the packet handling operation is not set for the selected communication node in the process of setting the packet handling operation in response to the fact that no link exists among the plurality of communication nodes.

[Mode 35]

The program according to any one of Modes 28 to 32, wherein the packet handling operation is set for a communication node that terminates a virtual circuit in the process of setting the packet handling operation in response to the fact that it was possible to set the packet handling operation for another communication node selected from two communication nodes that terminate the virtual circuit.

[Mode 36]

The program in Mode 35, wherein the packet handling operation is set for a communication node that terminates the virtual circuit in the process of setting the packet handling operation when a communication node that forwards a packet included in the virtual circuit exists.

[Mode 37]

The program in Mode 36 further including a forwarding path verification process of verifying a presence of a communication node that forwards a packet included in the virtual circuit, wherein whether or not to set the packet handling operation for a communication node that terminates the virtual circuit is determined in the process of setting the packet handling operation according to a verification result in the forwarding path verification process.

[Mode 38]

The program according to any one of Modes 28 to 32, wherein an active communication node is selected from a plurality of redundant communication nodes and the packet handling operation is set for a standby communication node out of the plurality of redundant communication nodes in the process of setting the packet handling operation in response to the fact that it was possible to set the packet handling operation for the active communication node.

Further, the disclosure of each Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned. Particularly, the ranges of the numerical values used in the present description should be interpreted as a specific numeric value or small range included in the ranges even in cases where it is not stated so.

The invention claimed is:

1. A control apparatus, comprising:
    a packet handling operation setting unit that selects a communication node for setting a packet handling operation for processing a packet from a plurality of communication nodes, wherein
    when the packet handling operation setting unit does not succeed in setting the packet handling operation in the selected communication node, the packet handling operation setting unit interrupts setting of the packet handling operation for the plurality of communication nodes, and
    when the packet handling operation setting unit succeeds in setting the packet handling operation in the selected communication node, the packet handling operation setting unit attempts to set the packet handling operation in communication nodes other than the selected communication node out of the plurality of communication nodes.

2. The control apparatus according to 1, wherein the packet handling operation setting unit selects an active communication node from a plurality of redundant communication nodes and sets the packet handling operation for a standby communication node out of the plurality of redundant communication nodes when the packet handling operation setting unit succeeds in setting the packet handling operation for the active communication node.

3. The control apparatus according to claim 1, wherein the packet handling operation setting unit sets the packet handling operation in parallel for communication nodes included in a group selected from a plurality of groups that includes at least one of the plurality of communication nodes.

4. The control apparatus according to claim 1, wherein the packet handling operation setting unit deletes the set packet handling operation from the selected communication node when the packet handling operation setting unit does not succeed in setting the packet handling operation in the selected communication node.

5. The control apparatus according to claim 1, wherein the communication node is selected from a plurality of communication nodes included in a forwarding path of a packet.

6. The control apparatus according to claim 1, further comprising a path calculation unit that calculates a forwarding path of the packet, wherein the path calculation unit recalculates a forwarding path of the packet when the packet handling operation setting unit does not succeed in setting the packet handling operation in the selected communication node.

7. The control apparatus according to claim 5, wherein the packet handling operation setting unit selects the communication node from the plurality of communication nodes on the basis of priority.

8. The control apparatus according to claim 7, wherein a higher priority is given to communication nodes located at both ends of the forwarding path out of the plurality of communication nodes than to communication nodes other than the communication nodes located at both ends.

9. The control apparatus according to claim 1, wherein the packet handling operation setting unit randomly selects the communication node from the plurality of communication nodes.

10. The control apparatus according to claim 1, wherein the packet handling operation setting unit does not set the packet handling operation for the selected communication node when the packet handling operation corresponding to the selected communication node cannot be generated.

11. The control apparatus according to claim 1, wherein the packet handling operation setting unit does not set the packet handling operation for the selected communication node when no link exists among the plurality of communication nodes.

12. The control apparatus according to claim 1, wherein the packet handling operation setting unit sets the packet handling operation for a communication node that terminates a virtual circuit when the packet handling operation setting unit succeeds in setting the packet handling operation for another communication node selected from two communication nodes that terminate the virtual circuit.

13. The control apparatus according to claim 12, wherein the packet handling operation setting unit sets the packet handling operation for a communication node that terminates the virtual circuit when a communication node that forwards a packet included in the virtual circuit exists.

14. The control apparatus according to claim 13 further comprising a forwarding path verification unit that verifies a presence of a communication node that forwards a packet included in the virtual circuit, wherein
    the packet handling operation setting unit determines whether or not to set the packet handling operation for a communication node that terminates the virtual circuit according to a result obtained by asking the forwarding path verification unit about the presence of a communication node that forwards a packet included in the virtual circuit.

15. A control apparatus control method, comprising:
    a step of selecting a communication node from a plurality of communication nodes for setting a packet handling operation for processing a packet;
    interrupting setting of the packet handling operation for the plurality of communication nodes when the packet handling operation setting unit does not succeed in setting the packet handling operation in the selected communication node; and
    attempting to set the packet handling operation for communication nodes other than the selected communication node out of the plurality of communication nodes when the packet handling operation setting unit succeeds in setting the packet handling operation in the selected communication node.

16. The control apparatus control method according to claim 15, wherein the packet handling operation is set for a communication node that terminates a virtual circuit in the step of setting the packet handling operation when the packet handling operation setting unit succeeds in setting the packet handling operation for another communication node selected from two communication nodes that terminate the virtual circuit.

17. The control apparatus control method according to claim 16, wherein the packet handling operation is set for a communication node that terminates the virtual circuit in the step of setting the packet handling operation when a communication node that forwards a packet included in the virtual circuit exists.

18. The control apparatus control method according to claim 17 further comprising a forwarding path verification step of verifying a presence of a communication node that forwards a packet included in the virtual circuit, wherein whether or not to set the packet handling operation for a communication node that terminates the virtual circuit is determined in the step of setting the packet handling operation according to a verification result in the forwarding path verification step.

19. The control apparatus control method according to claim 15, wherein an active communication node is selected from a plurality of redundant communication nodes and the packet handling operation is set for a standby communication node out of the plurality of redundant communication nodes in the step of setting the packet handling operation when the packet handling operation setting unit succeeds in setting the packet handling operation for the active communication node.

20. The control apparatus control method according to claim 15 further comprising a step of recalculating a forwarding path of the packet when it is not possible to set the packet handling operation for the communication node selected in the step of setting the packet handling operation.

21. The control apparatus control method according to claim 15, wherein the communication node is selected from the plurality of communication nodes on the basis of priority in the step of selecting a communication node.

22. The control apparatus control method according to claim 15, wherein the packet handling operation is not set for the selected communication node in the step of setting the packet handling operation when the packet handling operation corresponding to the selected communication node cannot be generated.

23. The control apparatus control method according to claim 15, wherein the packet handling operation is not set for the selected communication node in the step of setting the packet handling operation when no link exists among the plurality of communication nodes.

24. A non-transitory computer-readable recording medium storing program instructions, which when executed by a computer embedded on a control apparatus, causes the computer to perform a method comprising:
selecting a communication node, for setting a packet handling operation for processing a packet, from a plurality of communication nodes;
interrupting setting of the packet handling operation for the plurality of communication nodes when the packet handling operation setting unit does not succeed in setting the packet handling operation in the selected communication node; and
attempting to set the packet handling operation in communication nodes other than the selected communication node out of the plurality of communication nodes when the packet handling operation setting unit succeeds in setting the packet handling operation in the selected communication node.

25. The medium according to claim 24, wherein the packet handling operation is set for a communication node that terminates a virtual circuit in the process of setting the packet handling operation when the packet handling operation setting unit succeeds in setting the packet handling operation for another communication node selected from two communication nodes that terminate the virtual circuit.

26. The medium according to claim 25, wherein the packet handling operation is set for a communication node that terminates the virtual circuit in the process of setting the packet handling operation when a communication node that forwards a packet included in the virtual circuit exists.

27. The medium according to claim 26 further including a forwarding path verification process of verifying a presence of a communication node that forwards a packet included in the virtual circuit, wherein whether or not to set the packet handling operation for a communication node that terminates the virtual circuit is determined in the process of setting the packet handling operation according to a verification result in the forwarding path verification process.

28. The medium according to claim 24, wherein an active communication node is selected from a plurality of redundant communication nodes and the packet handling operation is set for a standby communication node out of the plurality of redundant communication nodes in the process of setting the packet handling operation when the packet handling operation setting unit succeeds in setting the packet handling operation for the active communication node.

29. The medium according to any one of claims 24, wherein the packet handling operation is not set for the selected communication node in the process of setting the packet handling operation when no link exists among the plurality of communication nodes.

30. The medium according to claim 24, wherein the packet handling operation is not set for the selected communication node in the process of setting the packet handling operation when the packet handling operation corresponding to the selected communication node cannot be generated.

31. The medium according to claim 24, wherein the method performed by the computer further includes recalculating a forwarding path of the packet when it is not possible to set the packet handling operation for the communication node selected in the process of setting the packet handling operation.

32. The medium according to claim 24, wherein the communication node is selected from the plurality of communication nodes on the basis of priority in the process of selecting a communication node.

\* \* \* \* \*